United States Patent
Cheng et al.

(10) Patent No.: US 12,467,842 B2
(45) Date of Patent: Nov. 11, 2025

(54) WIDEFIELD INTERFEROMETRIC DEFOCUS-ENHANCED (WIDE) MID-INFRARED (MIR) PHOTOTHERMAL MICROSCOPY

(71) Applicant: Trustees of Boston University, Boston, MA (US)

(72) Inventors: Ji-Xin Cheng, Newton, MA (US); Qing Xia, Boston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/761,564

(22) Filed: Jul. 2, 2024

(65) Prior Publication Data
US 2025/0012695 A1    Jan. 9, 2025

Related U.S. Application Data

(60) Provisional application No. 63/525,443, filed on Jul. 7, 2023.

(51) Int. Cl.
*G01N 15/1434*    (2024.01)
*G01N 15/01*    (2024.01)

(52) U.S. Cl.
CPC .......... *G01N 15/01* (2024.01); *G01N 15/1434* (2013.01); *G01N 2015/1452* (2013.01)

(58) Field of Classification Search
CPC ............... G01N 15/01; G01N 15/1434; G01N 2015/1452
See application file for complete search history.

(56) References Cited

U.S. PATENT DOCUMENTS

| | | | |
|---|---|---|---|
| 11,047,790 B2 | 6/2021 | Unlu et al. | |
| 2010/0330578 A1* | 12/2010 | Duhr | B01L 3/50273 422/82.08 |
| 2018/0143418 A1* | 5/2018 | Kapanidis | G02B 21/26 |
| 2019/0120753 A1* | 4/2019 | Prater | G01N 21/59 |
| 2021/0118661 A1 | 4/2021 | Corkum et al. | |
| 2021/0161385 A1 | 6/2021 | Ben-Yakar et al. | |
| 2023/0063843 A1 | 3/2023 | Prater et al. | |
| 2024/0118208 A1* | 4/2024 | Prater | G01N 21/1717 |

OTHER PUBLICATIONS

Berman H, Henrick K, Nakamura H. Announcing the worldwide Protein Data Bank. Nat. Struct. Biol. 10, 980 (2003).

(Continued)

*Primary Examiner* — David P Porta
*Assistant Examiner* — Mamadou Faye
(74) *Attorney, Agent, or Firm* — Cesari and McKenna, LLP; Steven M. Mills

(57) ABSTRACT

A wide-field microscopy system and method for imaging a sample include directing infrared light onto the sample to selectively heat the sample. Probe light is also directed onto the sample. An objective collects the probe light after it interacts with the sample. The collected probe light is detected at a detector. A relative distance between the objective and sample is adjusted to introduce an optical defocus enhancement to enhance detection of a change in detected probe light that is indicative of infrared absorption by the sample.

13 Claims, 21 Drawing Sheets

(56) References Cited

OTHER PUBLICATIONS

Tsuda S, Yamaguchi S, Kanamori Y, Yugami H. Spectral and angular shaping of infrared radiation in a polymer resonator with molecular vibrational modes. Opt. Express 26, 6899-6915 (2018).

Aspnes DE, Studna AA. Dielectric Functions and Optical Pparameters of Si, Ge, GaP, GaAs, GaSb, InP, InAs, and InSb from 1.5 to 6.0 eV. Phys. Rev. B 27, 985-1009 (1983).

Chen Z, Chen F, Lee HJ, Zhang M, Yin X, Dai M, et al. LIPA-driven hydrolysis of cholesteryl arachidonate promotes cancer metastasis via NF-κB. bioRxiv, 2022.2003.2011.484042 (2022).

Trueb J, Avci O, Sevenler D, Connor JH, Unlu MS. Robust visualization and discrimination of nanoparticles by interferometric imaging. IEEE J. Sel. Top. Quantum Electron. 23, 394-403 (2017).

Cyrklaff M, Risco C, Fernandez JJ, Jimenez MV, Esteban M, Baumeister W, et al. Cryoelectron tomography of vaccinia virus. Proc. Natl. Acad. Sci. U.S.A. 102, 2772-2777 (2005).

Malkin AJ, McPherson A, Gershon PD. Structure of intracellular mature vaccinia virus visualized by in situ atomic force microscopy. J. Virol. 77, 6332-6340 (2003).

Barth A. Infrared spectroscopy of proteins. Biochim. Biophys. Acta. 1767, 1073-1101 (2007).

Tsuboi M. Application of infrared spectroscopy to structure studies of nucleic acids. Appl. Spectrosc. Rev. 3, 45-90 (1970).

Zhang Y, Yurdakul C, Devaux AJ, Wang L, Xu XG, Connor JH, et al. Vibrational spectroscopic detection of a sngle virus by midinfrared photothermal microscopy. Anal. Chem. 93, 4100-4107 (2021).

Kim D, Lee JY, Yang JS, Kim JW, Kim VN, Chang H. The architecture of SARS-CoV-2 transcriptome. Cell 181, 914-921 e910 (2020).

Farahat RA, Abdelaal A, Shah J, Ghozy S, Sah R, Bonilla-Aldana DK, et al. Monkeypox outbreaks during COVID-19 pandemic: Are we looking at an independent phenomenon or an overlapping pandemic? Ann. Clin. Microbiol. Antimicrob. 21, 26 (2022).

Li Z, Aleshire K, Kuno M, Hartland GV. Super-resolution far-field infrared imaging by photothermal heterodyne imaging. J. Phys. Chem. B 121, 8838-8846 (2017).

Pavlovetc IM, Podshivaylov EA, Chatterjee R, Hartland GV, Frantsuzov PA, Kuno M. Infrared photothermal heterodyne imaging: Contrast mechanism and detection limits. J. Appl. Phys. 127, 165101 (2020).

Lai CC, Hsu CK, Yen MY, Lee PI, Ko WC, Hsueh PR. Monkeypox: An emerging global threat during the COVID-19 pandemic. J. Microbiol. Immunol. Infect. 55, 787-794 (2022).

Mahase E. Seven Monkeypox cases are confirmed in England. BMJ 377, o1239 (2022).

Weissleder R, Lee H, Ko J, Pittet MJ. COVID-19 diagnostics in context. Sci. Transl. Med. 12, eabc1931 (2020).

Smyrlaki I, Ekman M, Lentini A, Rufino de Sousa N, Papanicolaou N, Vondracek M, et al.Massive and rapid COVID-19 testing is feasible by extraction-free SARS-CoV-2 RT-PCR. Nat. Commun. 11, 4812 (2020).

Li Y, Olson VA, Laue T, Laker MT, Damon IK. Detection of monkeypox virus with real-time PCR assays. J. Clin. Virol. 36, 194-203 (2006).

Gorshkov K, Susumu K, Chen J, Xu M, Pradhan M, Zhu W, et al. Quantum dot-conjugated SARSCoV-2 spike pseudo-virions enable tracking of angiotensin converting enzyme 2 binding and endocytosis. ACS Nano 14, 12234-12247 (2020).

Moitra P, Alafeef M, Dighe K, Frieman MB, Pan D. Selective naked-eye detection of SARS-CoV-2 mediated by N gene targeted antisense oligonucleotide capped plasmonic nanoparticles. ACS Nano 14, 7617-7627 (2020).

Joynt GM, Wu WKK. Understanding COVID-19: what does viral RNA load really mean? Lancet Infect. Dis. 20, 635-636 (2020).

Bouton TC, Atarere J, Turcinovic J, Seitz S, Sher-Jan C, Gilbert M, et al. Viral dynamics of Omicron and Delta SARS-CoV-2 variants with implications for timing of release from isolation: a longitudinal cohort study. Clin. Infect. Dis., ciac510 (2022).

Cosimi LA, Kelly C, Esposito S, Seitz S, Turcinovic J, Connor JH, et al. Duration of symptoms and association with positive home rapid antigen test results after infection with SARS-CoV-2. JAMA Netw. Open 5, e2225331 (2022).

Soler M, Estevez MC, Cardenosa-Rubio M, Astua A, Lechuga LM. How nanophotonic label-free biosensors can contribute to rapid and massive diagnostics of respiratory virus infections: COVID-19 case. ACS Sens. 5, 2663-2678 (2020).

Lukose J, Chidangil S, George SD. Optical technologies for the detection of viruses like COVID-19: Progress and prospects. Biosens. Bioelectron. 178, 113004 (2021).

Ortega-Arroyo J, Kukura P. Interferometric scattering microscopy (iSCAT): New frontiers in ultrafast and ultrasensitive optical microscopy. Phys. Chem. Chem. Phys. 14, 15625-15636 (2012).

Huang YF, Zhuo GY, Chou CY, Lin CH, Chang W, Hsieh CL. Coherent brightfield microscopy provides the spatiotemporal resolution to study early stage viral infection in live cells. ACS Nano 11, 2575-2585 (2017).

Kukura P, Ewers H, Muller C, Renn A, Helenius A, Sandoghdar V. High-speed nanoscopic tracking of the position and orientation of a single virus. Nat. Methods 6, 923-927 (2009).

Faez S, Lahini Y, Weidlich S, Garmann RF, Wondraczek K, Zeisberger M, et al. Fast, label-free tracking of single viruses and weakly scattering nanoparticles in a nanofluidic optical fiber. ACS Nano 9, 12349-12357 (2015).

Scherr SM, Daaboul GG, Trueb J, Sevenler D, Fawcett H, Goldberg B, et al. Real-time capture and visualization of individual viruses in complex media. ACS Nano 10, 2827-2833 (2016).

Li N, Wang X, Tibbs J, Che C, Peinetti AS, Zhao B, et al. Label-free digital detection of intact virions by enhanced scattering microscopy. J. Am. Chem. Soc. 144, 1498-1502 (2022).

Fenner F, Bachmann PA, Gibbs EPJ, Murphy FA, Studdert MJ, White DO. Chapter 1—Structure and composition of viruses. In Vet. Microbiol. (Academic Press, 1987).

Park J, Hwang M, Choi B, Jeong H, Jung JH, Kim HK, et al. Exosome classification by pattern analysis of surface-enhanced Raman spectroscopy data for lung cancer diagnosis. Anal. Chem. 89, 6695-6701 (2017).

Dou T, Li Z, Zhang J, Evilevitch A, Kurouski D. Nanoscale structural characterization of individual viral particles using atomic force microscopy infrared spectroscopy (AFM-IR) and tip-enhanced Raman spectroscopy (TERS). Anal. Chem. 92, 11297-11304 (2020).

Deckert V, Deckert-Gaudig T, Cialla-May D, Popp J, Zell R, Deinhard-Emmer S, et al. Laser spectroscopic technique for direct identification of a single virus I: Faster Cars. Proc. Natl. Acad. Sci. U.S.A. 117, 27820-27824 (2020).

Gamage S, Howard M, Makita H, Cross B, Hastings G, Luo M, et al. Probing structural changes in single enveloped virus particles using nano-infrared spectroscopic imaging. PLoS One 13, e0199112 (2018).

Yang Y, Peng Y, Lin C, Long L, Hu J, He J, et al. Human ACE2-functionalized gold "virus-trap" nanostructures for accurate capture of SARS-CoV-2 and single-virus SERS detection. Nanomicro Lett 13, 109 (2021).

Matthäus C, Bird B, Miljković M, Chernenko T, Romeo M, Diem M. Chapter 10 Infrared and Raman microscopy in cell biology. In Methods Cell Biol. (Academic Press, 2008).

Bai Y, Yin J, Cheng JX. Bond-selective imaging by optically sensing the mid-infrared photothermal effect. Sci. Adv. 7, eabg1559 (2021).

Xia Q, Yin J, Guo Z, Cheng JX. Mid-Infrared Photothermal Microscopy: Principle, Instrumentation, and Applications. J. Phys. Chem. B 126, 8597-8613 (2022).

Zhang D, Li C, Zhang C, Slipchenko MN, Eakins G, Cheng JX. Depth-resolved mid-infrared photothermal imaging of living cells and organisms with submicrometer spatial resolution. Sci. Adv. 2, e1600521 (2016).

Bai Y, Zhang D, Lan L, Huang Y, Maize K, Shakouri A, et al. Ultrafast chemical imaging by widefield photothermal sensing of infrared absorption. Sci. Adv. 5, eaav7127 (2019).

Harrison SC, Alberts B, Ehrenfeld E, Enquist L, Fineberg H, McKnight SL, et al. Discovery of antivirals against Smallpox. Proc. Natl. Acad. Sci. U.S.A. 101, 11178-11192 (2004).

(56) References Cited

OTHER PUBLICATIONS

Rodriguez LL, Fitch WM, Nichol ST. Ecological factors rather than temporal factors dominate the evolution of vesicular stomatitis virus. Proc. Natl. Acad. Sci. U.S.A 93, 13030-13035 (1996).

Gershon AA, Breuer J, Cohen JI, Cohrs RJ, Gershon MD, Gilden D, et al. Varicella zoster virus infection. Nat. Rev. Dis. Primers 1, 15016 (2015).

Sevenler D, Avci O, Unlu MS. Quantitative interferometric reflectance imaging for the detection and measurement of biological nanoparticles. Biomed. Opt. Express 8, 2976-2989 (2017).

Taylor RW, Sandoghdar V. Interferometric scattering microscopy: Seeing single nanoparticles and molecules via Rayleigh scattering. Nano Lett. 19, 4827-4835 (2019).

Zong H, Yurdakul C, Bai Y, Zhang M, Unlu MS, Cheng JX. Background-suppressed highthroughput mid-infrared photothermal microscopy via pupil engineering. ACS Photonics 8, 3323-3336 (2021).

Yurdakul C, Zong HN, Bai YR, Cheng JX, Unlu MS. Bond-selective interferometric scattering microscopy. J. Phys. D 54, 364002 (2021).

Hohenester U, Trügler A. MNPBEM—A Matlab toolbox for the simulation of plasmonic nanoparticles. Comput. Phys. Commun. 183, 370-381 (2012).

Jitian S, Bratu I, Lazar MD. Determination of optical constants of polymethyl methacrylate pilms from IR reflection-absorption spectra. AIP Conf. Proc 1425, 26-29 (2012).

Yurdakul C, Avci O, Matlock A, Devaux AJ, Quintero MV, Ozbay E, et al. High-throughput, high-resolution interferometric light microscopy of biological nanoparticles. ACS Nano 14, 2002-2013 (2020).

Daaboul GG, Lopez CA, Chinnala J, Goldberg BB, Connor JH, Unlu MS. Digital sensing and sizing of vesicular stomatitis virus pseudotypes in complex media: A model for Ebola and Marburg detection. ACS Nano 8, 6047-6055 (2014).

Goldsmith CS, Miller SE. Modern uses of electron microscopy for detection of viruses. Clin. Microbiol. Rev. 22, 552-563 (2009).

Biel SS, Gelderblom HR. Diagnostic electron microscopy is still a timely and rewarding method. J. Clin. Virol. 13, 105-119 (1999).

Zerboni L, Sen N, Oliver SL, Arvin AM. Molecular mechanisms of varicella zoster virus pathogenesis. Nat. Rev. Microbiol 12, 197-210 (2014).

* cited by examiner

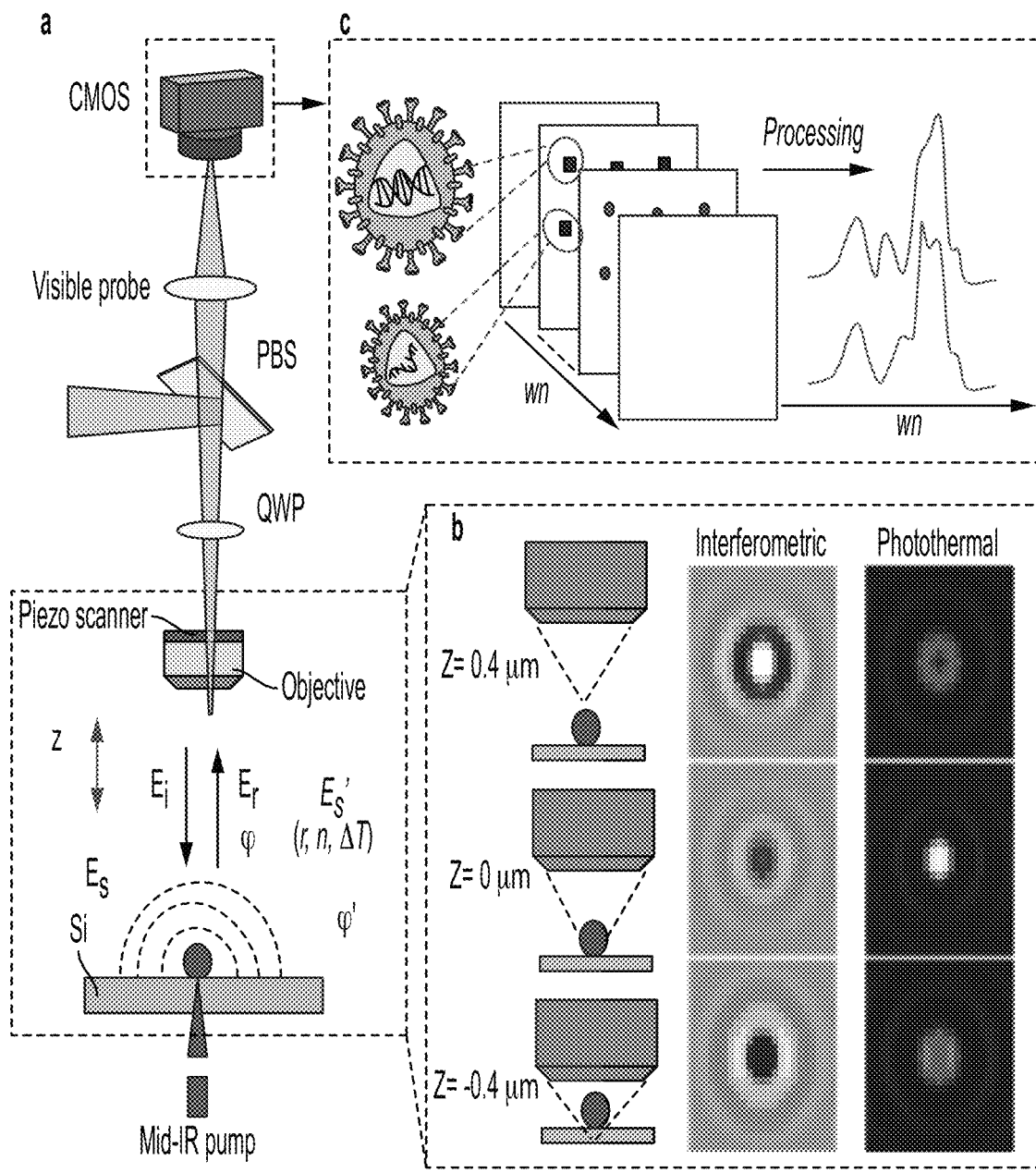
Figs. 1(a), 1(b), and 1(c)

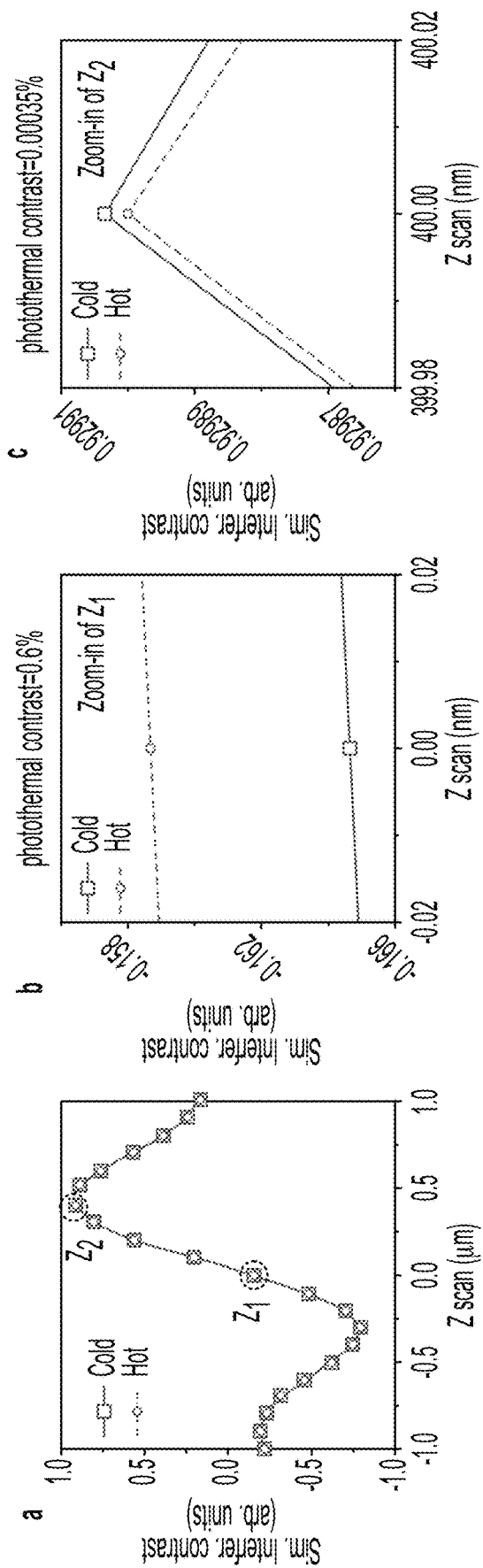
Figs. 2(a), 2(b), and 2(c)

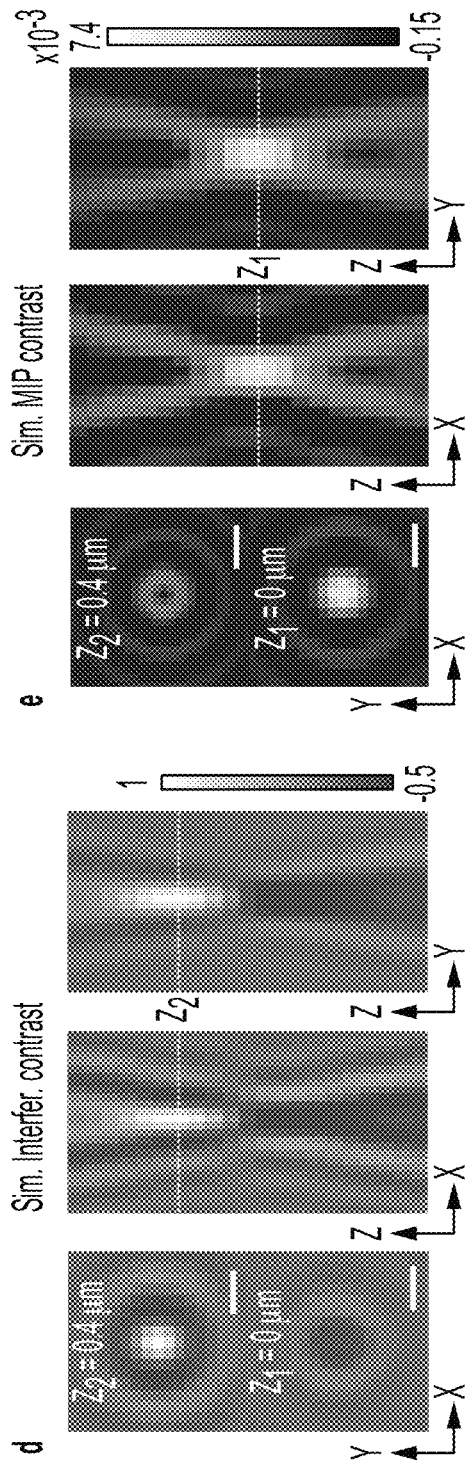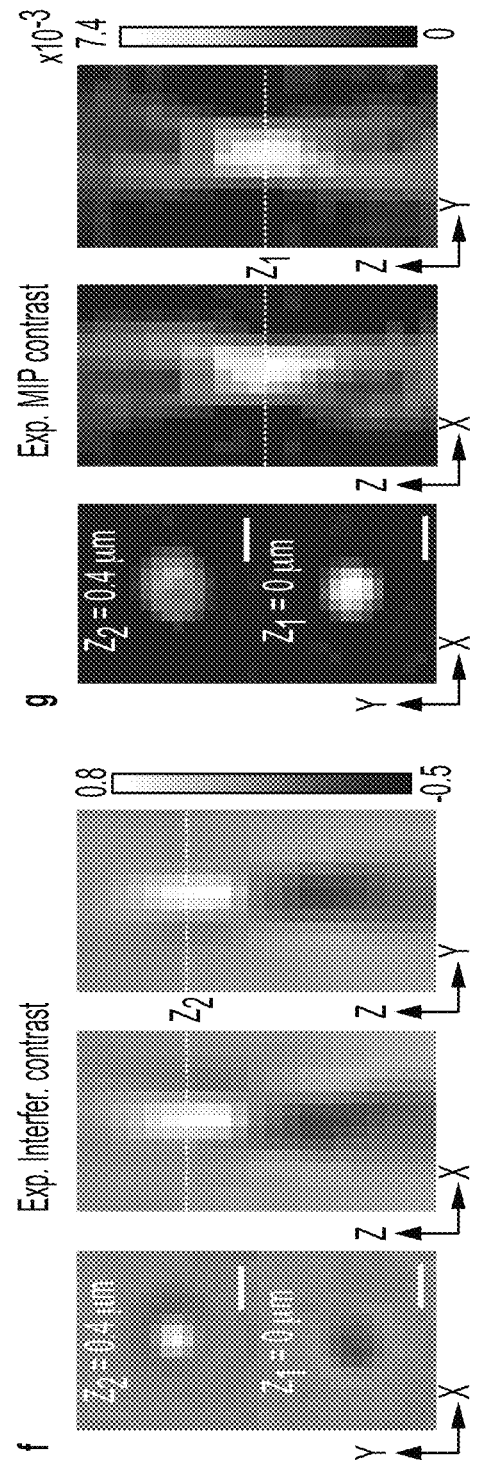
Figs. 2(d), 2(e), 2(f) and 2(g)

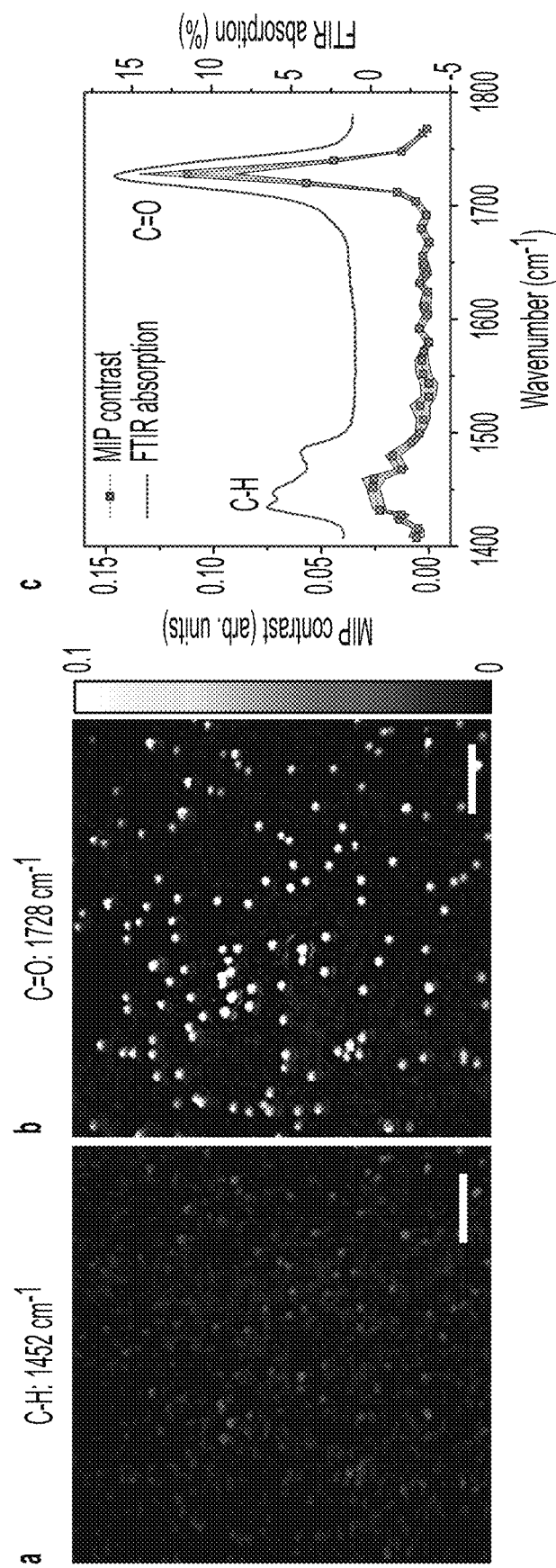
Figs. 3(a), 3(b), and 3(c)

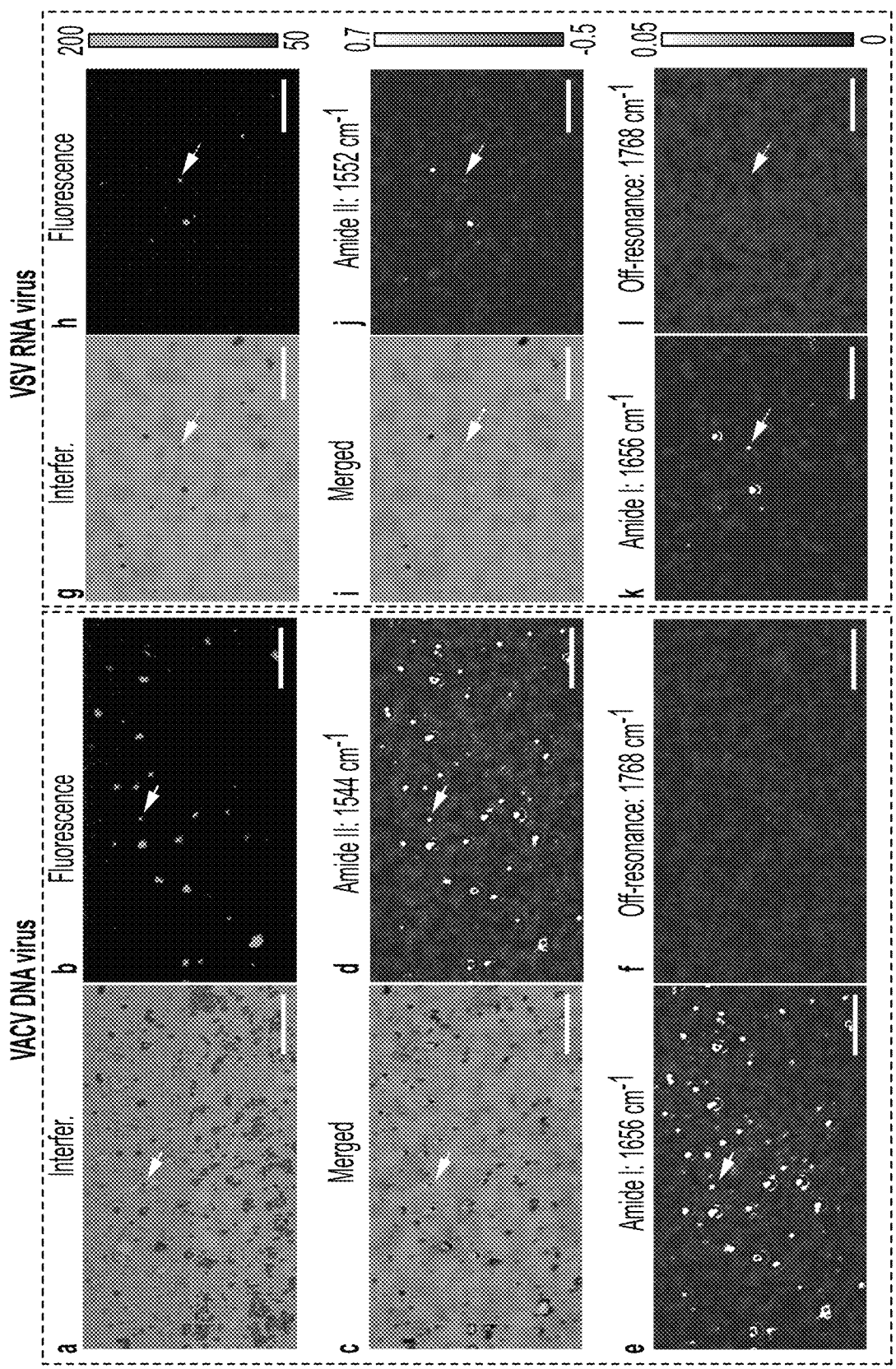
Figs. 4(a), 4(b), 4(c), 4(d), 4(e), 4(f), 4(g), 4(h), 4(i), 4(j), 4(k), and 4(l)

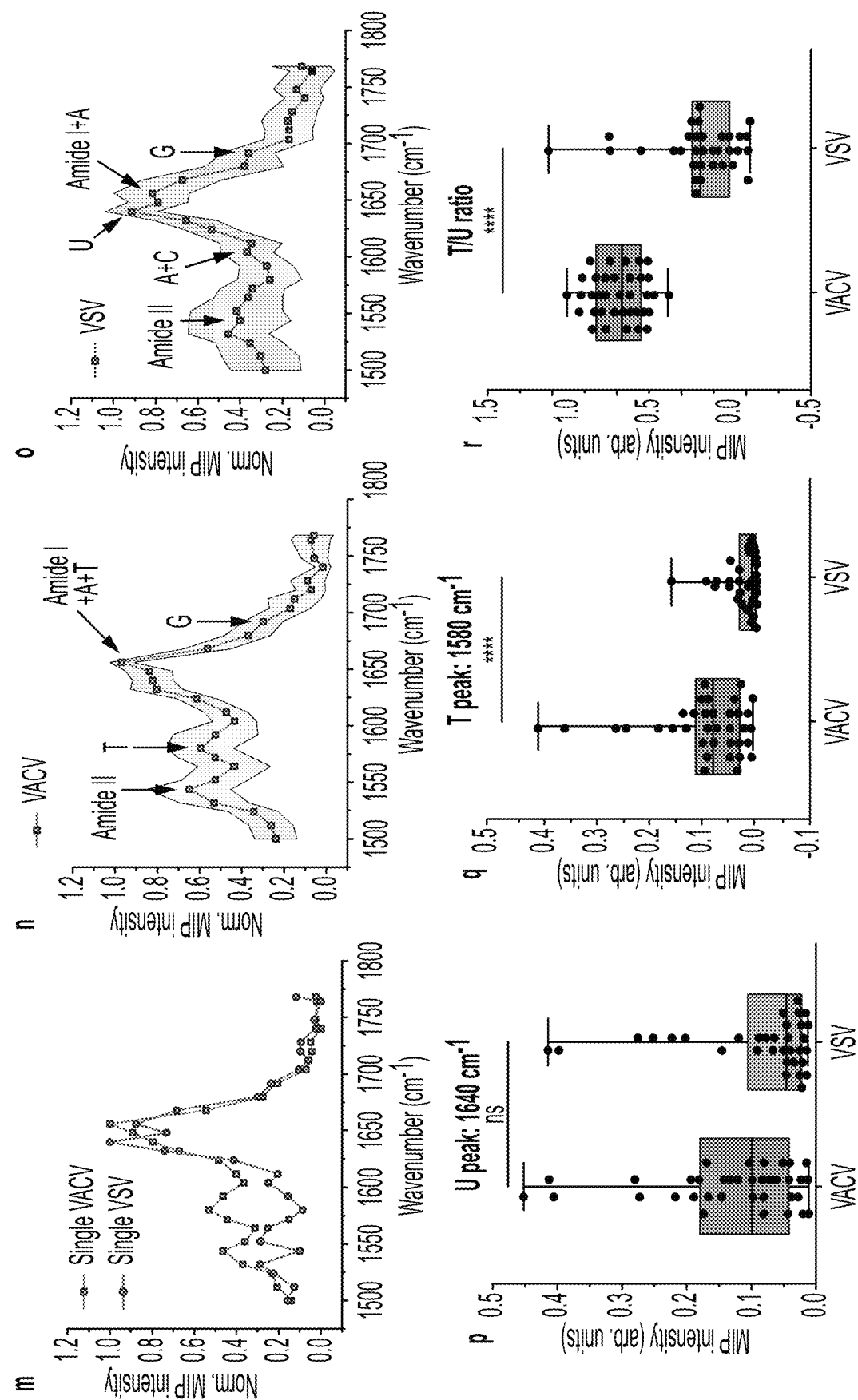
Figs. 4(m), 4(n), 4(o), 3(p), 4(q), and 4(r)

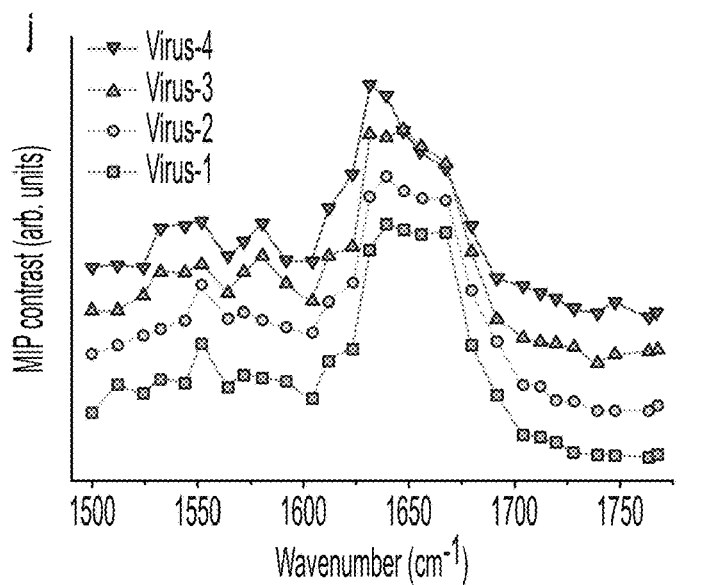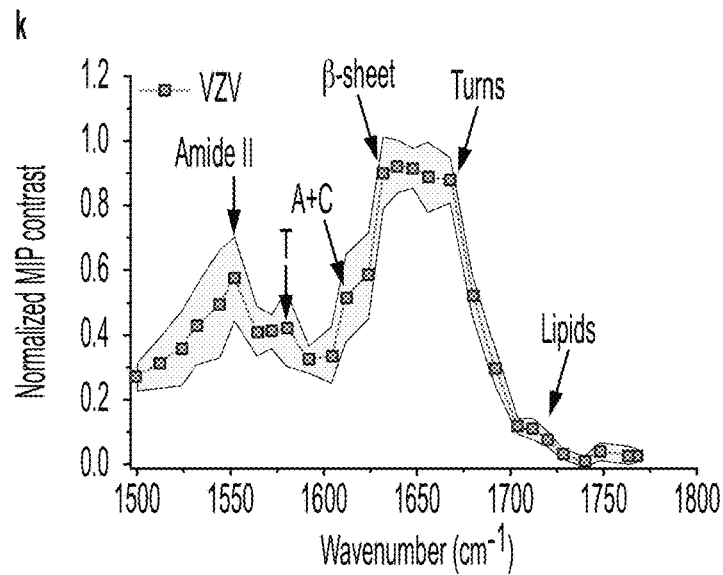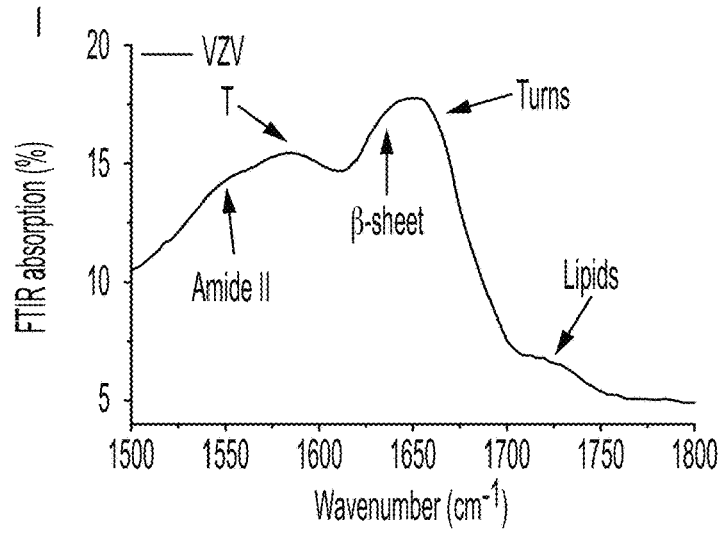
Figs. 5(j), 5(k), and 5(l)

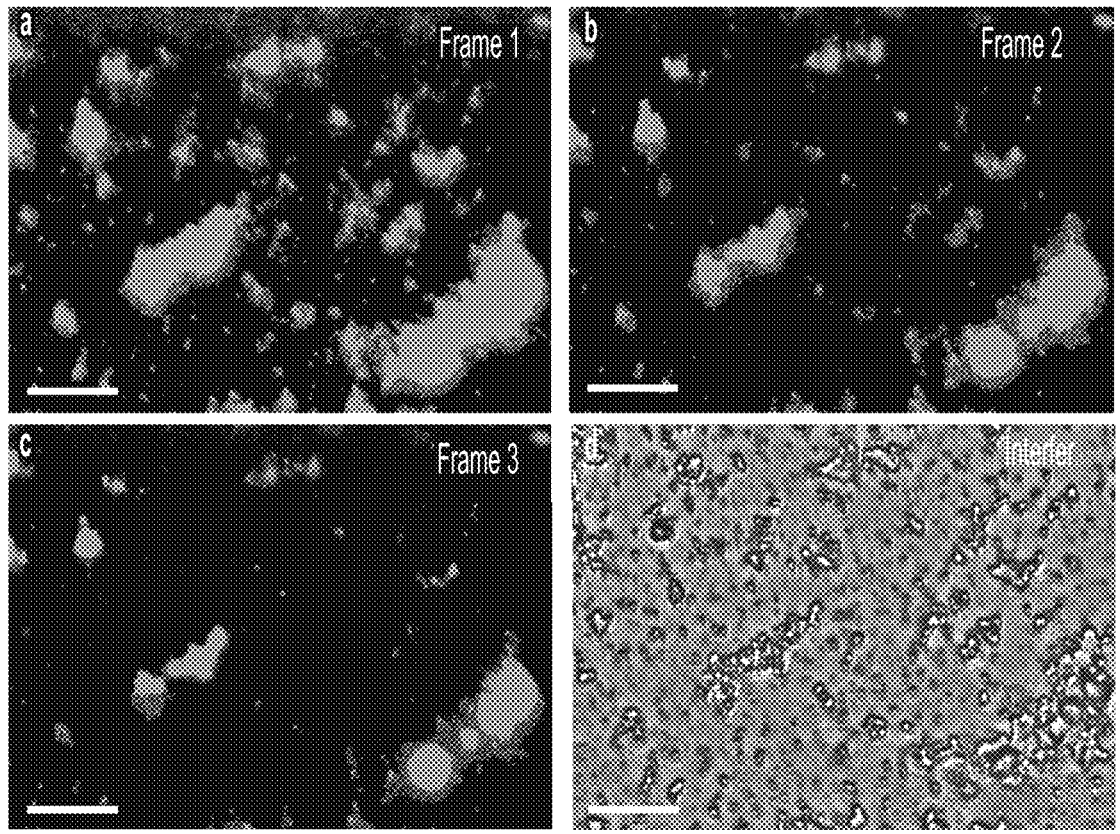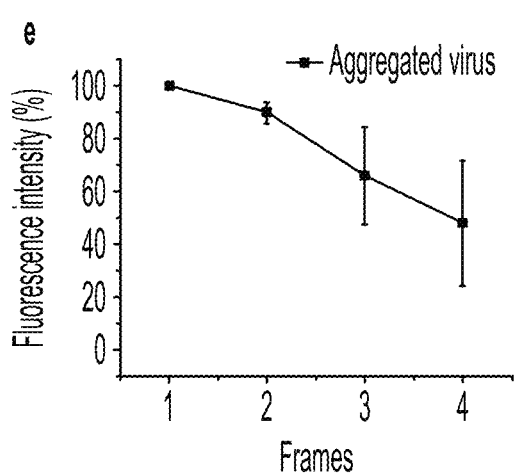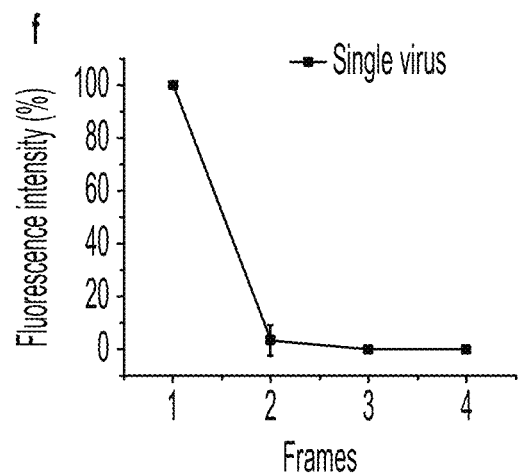
Figs. 14(a), 14(b), 14(c), 14(d), 14(e), 14(f)

WIDEFIELD INTERFEROMETRIC DEFOCUS-ENHANCED (WIDE) MID-INFRARED (MIR) PHOTOTHERMAL MICROSCOPY

CROSS REFERENCE TO RELATED APPLICATIONS

This application claims the benefit of U.S. Provisional Application No. 63/525,443, filed on Jul. 7, 2023, the entire contents of which are incorporated herein by reference.

GOVERNMENT SUPPORT

This invention was made with government support under Grant No. GM136223 awarded by the National Institutes of Health. The government has certain rights in the invention.

FIELD OF THE TECHNOLOGY

The subject disclosure relates generally to microscopy systems and methods and, more particularly, to mid-infrared photothermal microscopy, and, more particularly, to improvements and enhancements to mid-infrared photothermal microscopy.

BACKGROUND OF THE TECHNOLOGY

Clinical identification and fundamental study of viruses rely on the detection of viral proteins or viral nucleic acids. Yet, amplification-based and antigen-based methods are not able to provide precise compositional information of individual virions due to small particle size and low-abundance chemical contents (e.g., ~5000 proteins in a vesicular stomatitis virus).

SUMMARY OF THE TECHNOLOGY

According to a first aspect, a wide-field microscopy system for imaging a sample is provided. The system includes a source of infrared light for generating infrared light to be directed onto the sample to selectively heat the sample. A source of probe light generates probe light to be directed onto the sample. An objective collects probe light after interacting with the sample, and a detection system detects collected probe light. The system further includes an actuator for adjusting a relative distance between the sample and objective to introduce an optical defocus to enhance detection of a change in detected probe light that is indicative of infrared absorption by the sample.

In some exemplary embodiments, the probe light is pulsed.

In some exemplary embodiments, the infrared light is pulsed.

In some exemplary embodiments, the system further includes a delay pulse generator coupled to the source of infrared light, the source of probe light and the detection system to synchronize the source of infrared light, the source of probe light and the detection system.

In some exemplary embodiments, the infrared light is mid-infrared (MIR) light.

In some exemplary embodiments, the source of infrared light is a mid-infrared (MIR) laser.

In some exemplary embodiments, the source of the probe light is a visible light laser.

In some exemplary embodiments, the detection system comprises a camera. For example, the camera can be a complementary metal oxide semiconductor (CMOS) camera.

According to another aspect, a wide-field microscopy method for imaging a sample is provided. The method includes generating infrared light to be directed onto the sample to selectively heat the sample; generating probe light to be directed onto the sample; collecting with an objective probe light after interacting with sample; detecting at collected probe light at a detector; and adjusting a relative distance between the objective and sample to introduce an optical defocus enhancement to enhance detection of a change in detected probe light that is indicative of infrared absorption by the sample.

In some exemplary embodiments, the probe light is pulsed.

In some exemplary embodiments, the infrared light is pulsed.

In some exemplary embodiments, the method further comprises synchronizing time of infrared and probe light pulses and the detection system.

In some exemplary embodiments, the infrared light is mid-infrared (MIR) light.

In some exemplary embodiments, the source of infrared light is a mid-infrared (MIR) laser.

In some exemplary embodiments, the source of the probe light is a visible light laser.

In some exemplary embodiments, the detection system comprises a camera. For example, the camera can be a CMOS camera.

In some exemplary embodiments, the sample comprises a virus.

In some exemplary embodiments, the optical defocus enhancement enables infrared spectroscopic analysis of individual viruses.

In some exemplary embodiments, the widefield infrared microscopy method is used to perform viral fingerprint analysis.

In some exemplary embodiments, the method comprises measuring a change of detected probe light indicative of infrared absorption at a plurality of relative distances between the sample and objective to determine an optimal defocus that substantially maximizes the detection of infrared absorption by the sample.

BRIEF DESCRIPTION OF THE DRAWINGS

FIGS. 1(a), 1(b), and 1(c) are schematic functional diagrams of a WIDE-MIP microscopy system and principle of interferometric scattering-based MIP imaging, according to some exemplary embodiments.

FIGS. 2(a) through 2(i) illustrate simulation and experimental validation of interferometric defocus-enhanced photothermal contrast, according to some exemplary embodiments.

FIGS. 3(a), 3(b), and 3(c) illustrate hyperspectral performance and spectral fidelity of WIDE-MIP microscopy, according to some exemplary embodiments.

FIGS. 4(a) through 4(r) illustrate fingerprinting detection of single VACV and VSV viruses, according to some exemplary embodiments.

FIGS. 5(a) through 5(l) illustrate protein secondary structure identification in single VZV viruses, according to some exemplary embodiments.

FIGS. 14(a) through 14(f) illustrate photobleaching analysis of single VACVs, according to some exemplary embodiments.

DETAILED DESCRIPTION

Figures 2H, 2I:
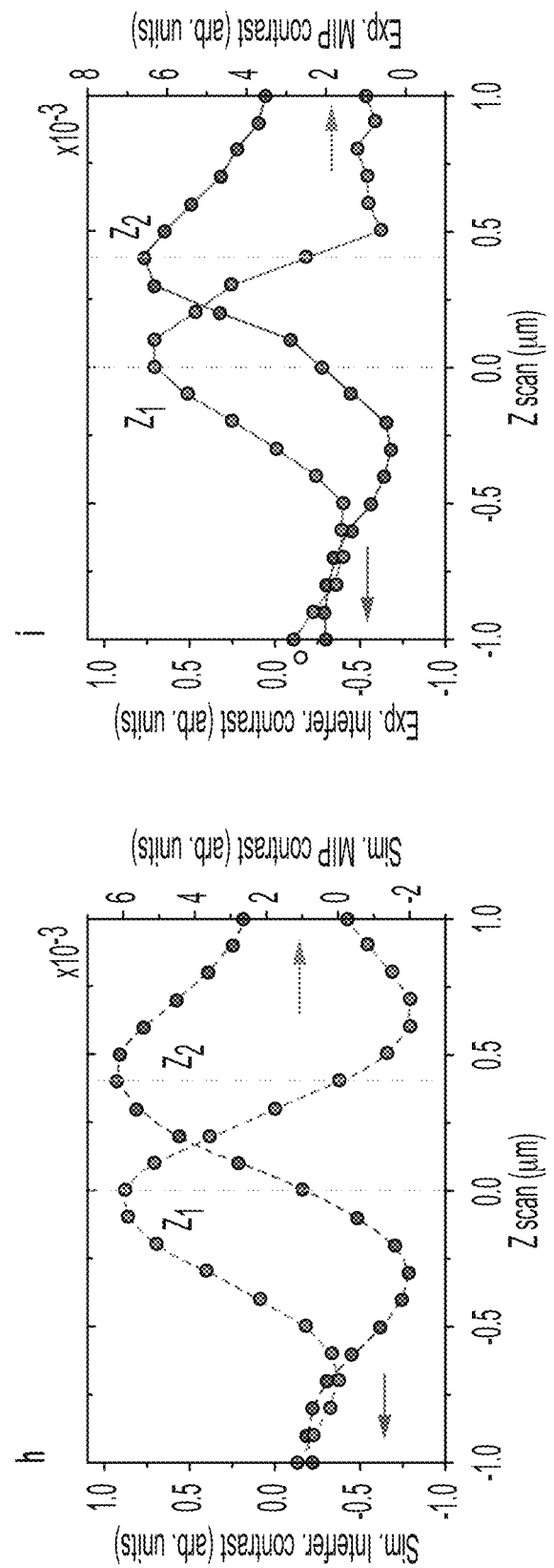

According to the current disclosure, described is a widefield interferometric defocus-enhanced mid-infrared photothermal (WIDE-MIP) microscope for high-throughput fingerprinting of single viruses. With the identification of feature absorption peaks, WIDE-MIP reveals the contents of viral proteins and nucleic acids in single DNA vaccinia viruses and RNA vesicular stomatitis viruses. Different nucleic acid signatures of thymine and uracil residue vibrations are obtained to differentiate DNA and RNA viruses. WIDE-MIP imaging further reveals an enriched β sheet components in DNA varicella-zoster virus proteins. Together, these advances open a new avenue for compositional analysis of viral vectors and elucidating protein function in an assembled virion.

The emergence of the monkeypox outbreak in early 2022 has posed a new global health threat during the coronavirus 19 (COVID-19) pandemic. With the spread of virus-based infectious diseases, rapid and accurate testing is crucial for mitigating the impact of current and future pandemics. Diagnostic tests on the viruses commonly rely on the detection of nucleic acids or surface proteins. Generally, the amount of viral nucleic acid in a single virion is lower than the amount of viral protein. Detecting viral nucleic acids is challenging without signal amplification techniques such as polymerase chain reaction. Although nucleic acid amplification tests and antigen rapid diagnostic tests can provide accurate testing results, they usually require pre-treatments of a large amount of virions, extraction or tagging that add time to any assay. It is noteworthy that residual viral RNA from patient specimens remains detectable even though patients have recovered or without culturable viruses. Thus, in addition to detecting viral fragments, new complement assays are required to identify the intact virions with preserved structure in order to confirm viral infection and reduce false diagnoses.

Accelerated efforts have been devoted to developing label-free technologies, in which optical detection and morphological characterization of single viruses have shown to be promising for clinical diagnosis. Although the scattering from a single virion is weak, it can be enhanced by interfering with a strong reference field in an interferometric light microscope. With the enhanced signal contrasts, interferometric imaging has been used for single-virus tracking and viral infection study. Towards translation into clinic, interferometric sensing methods have also demonstrated the visualization of single viruses in undiluted fetal bovine serum and rapid detection of single intact virion in human saliva. However, these methods lack molecular information of the viruses while the chemical contents are critical to viral structure and function.

Vibrational spectroscopic detection of viruses is valuable for analyzing the chemical components of virus strains. Methods relying on either Raman scattering or infrared (IR) absorption offer intrinsic chemical selectivity at single-virus level by using spectroscopic signatures of chemical bonds. Compared to Raman scattering, IR absorption offers eight orders of magnitude larger cross section that enables adequate chemical sensitivity and throughput. Mid-infrared photothermal (MIP) microscopy is an emerging technique based on mapping of local transient heat to achieve IR spectroscopic imaging at the diffraction limit of visible light. In MIP microscopy, a visible probe beam is used to detect photothermal-based chemical contrast induced by a mid-IR pump beam. Since the first demonstration of 3D MIP imaging of living cells, MIP microscopy has enabled broad applications in life science, ranging from individual bacteria, single cells, sliced tissues, to entire organisms. With counter-propagation of IR and visible beams, researchers have shown MIP imaging of 100 nm polystyrene beads. With interferometric scattering as the probe in a confocal configuration, MIP spectroscopic detection of a single virus was reported. However, the scanning-based MIP methods suffer from long acquisition time and low throughput. Although widefield MIP imaging was developed to allow ultrafast chemical imaging at a speed up to 1250 frames per second, it remains very challenging for widefield MIP to detect single viral nanoparticles and perform precise spectral analysis.

Figure 6A:
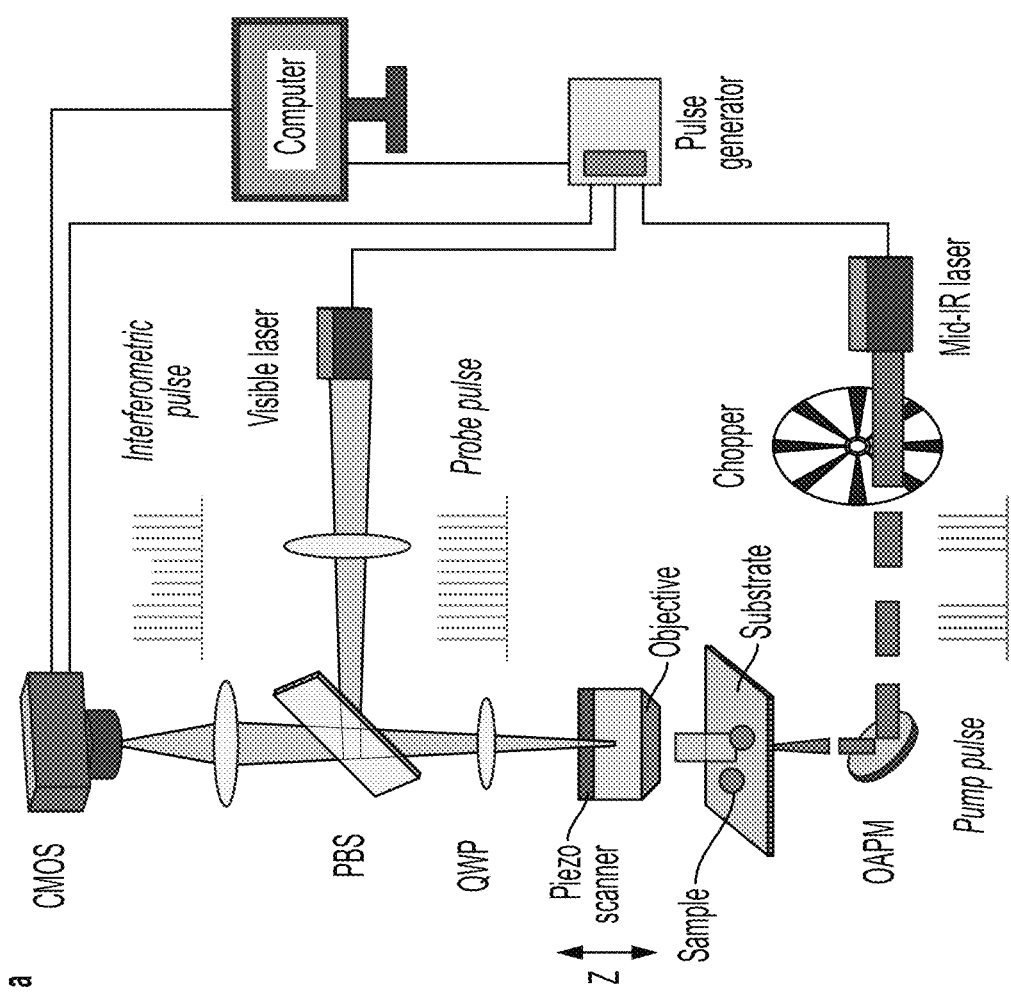
FIGS. 6(a) and 6(b) are schematic functional diagrams of a WIDE-MIP microscopy system and principle of interferometric scattering-based MIP imaging, according to some exemplary embodiments.

FIGS. 1(a), 1(b), 1(c), 6(a) and 6(b) are schematic functional diagrams of a WIDE-MIP microscopy system and principle of interferometric scattering-based MIP imaging, according to some exemplary embodiments. Referring to FIGS. 1(a) and 6(a), the system includes a complementary metal-oxide semiconductor (CMOS) camera receiving data for imaging according to the current disclosure. The system also includes a polarizing beam splitter PBS, a quarter-wave plate QWP, visible incident light field $E_i$, reflected field by the substrate $E_r$, scattered field by the sample $E_s$, IR modulation resulted scattered field by the sample $E_s'$, which is related to the radius (r), refractive index (n) and temperature change (ΔT) of the sample, φ: phase difference between $E_s$ and $E_r$. A delay pulse generator is used to synchronize the pump pulse, probe pulse and camera. FIG. 1(b) is a schematic illustration of interferometric defocus-enhanced photothermal contrast provided by Z-axis scanning of objective. The different positions are with respect to the substrate top surface (Z=0 μm). FIG. 1(c) illustrates the principle of fingerprinting DNA and RNA viruses by WIDE-MIP according to the current disclosure, in which wn refers to wavenumber. Hyperspectral images of single viruses are recorded by continuously tuning the IR wavenumber. Blue dots indicate DNA viruses, red dots indicate RNA viruses.

Figure 6B:
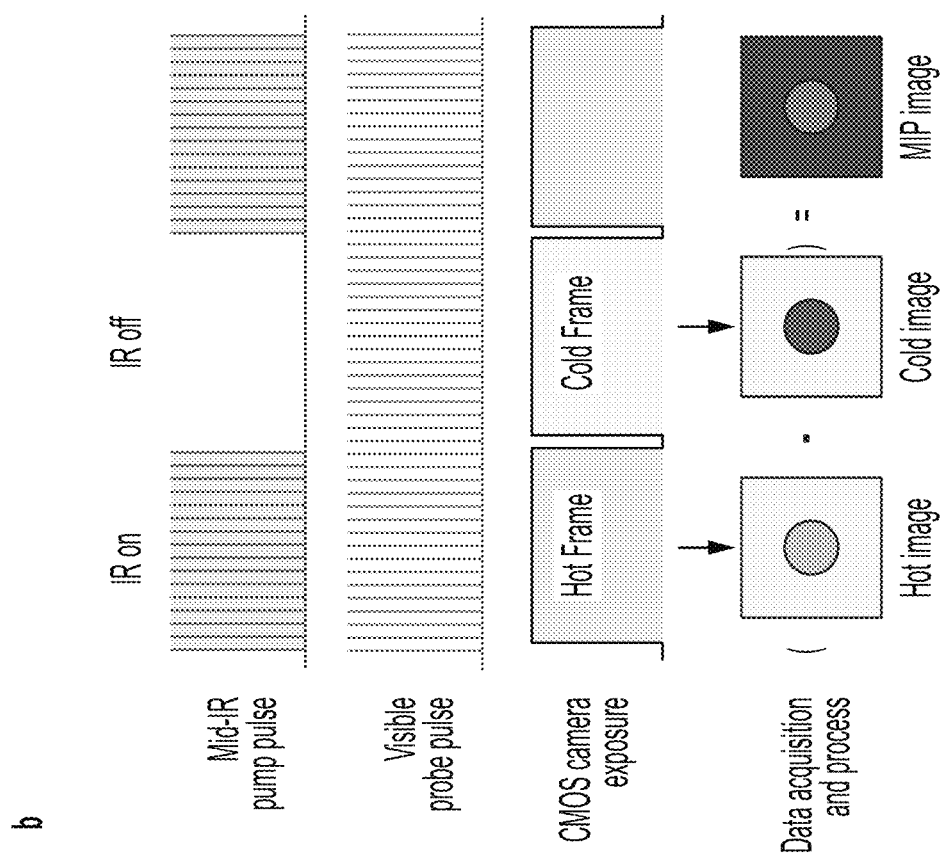

Continuing to refer to FIGS. 1(a), 1(b), 1(c), 6(a) and 6(b), which illustrate the WIDE-MIP microscope system setup and signal synchronization of the current technology, FIGS. 1(a) and 6(a) include schematic functional diagrams of the WIDE-MIP microscope of some exemplary embodiments. The IR pump beam is generated by a tunable (from 1400 to 1800 $cm^{-1}$) mid-IR laser operating at 20 kHz repetition rate with a ~20 ns pulse duration, which is further modulated by an optical chopper. The visible probe is provided with a pulsed 520 nm nanosecond laser with a pulse duration of 129 ns. The interferometric scattering is recorded by a 2 million well-depth camera. A delay pulse generator is used to synchronize the pump pulse, probe pulse and camera. The system further includes the polarizing beam splitter (PBS), off-axis parabolic mirror (OAPM), quarter-wave plate (QWP), complementary metal-oxide semiconductor (CMOS) camera. FIG. 6(b) illustrates the synchronization and data acquisition of WIDE-MIP microscopy of the exemplary embodiments. To synchronize and acquire data for WIDE-MIP microscopy, the delay pulse generator is triggered by the output signal from the nanosecond IR laser. The oscilloscope was used to monitor the IR and visible pulses through a Mercury-Cadmium-Telluride detector and a photodiode, respectively. The IR pulses were modulated to a 50% duty cycle by the optical chopper. The camera trigger signal delay was adjusted to capture both IR on (hot) and IR off (cold) frames. The MIP contrast was generated by the subtraction of hot and cold frames.

According to the current disclosure, the development and validation of a widefield interferometric defocus-enhanced MIP (WIDE-MIP) microscope (FIG. 1(a)) for fingerprint analysis of bio-nanoparticles is described. As photothermal signal is a modulation of visible beam intensity, it is commonly believed that an optimal MIP contrast is generated when the bright field contrast is maximized. Yet, this belief does not hold for interferometric MIP microscopy where the signal strongly depends on the relative phase between the particle-scattered photons and the substrate-reflected reference field. Instead, we find that by fine tuning the focus position of the objective, the defocused interferometric imaging results in a greatly improved MIP contrast (FIG. 1(b)). We constructed a theoretical framework that calculates the defocused interferometric photothermal images of single nanoparticles with different size. This framework provides the optimal MIP detection focus position relative to the nominal focus position of the particles. Compared to reported scanning methods, we demonstrate vibrational detection of 100 nm polymethyl methacrylate (PMMA) particles at similar signal-to-noise ratio (SNR) level but with a three orders of magnitude higher throughput. By tuning the IR wavenumber, WIDE-MIP spectra of single viruses are acquired from the hyperspectral images (FIG. 1(c)). We systematically recorded the fingerprints of single vaccinia viruses (VACV), a DNA poxvirus related to Monkeypox, single vesicular stomatitis viruses (VSV), the prototype RNA virus, and varicella-zoster viruses (VZV), an DNA virus included in the herpesvirus group. Dramatically, the spectra provide signatures of not only viral proteins, but also nucleic acids of individual viruses. Nucleic acid peaks of thymine (T) and uracil (U) residue vibrations in VACV and VSV were detected respectively, indicating unique IR signature of DNA and RNA viruses. Besides the contents, WIDE-MIP data further suggests a β enriched sheet structure in VZV, showing the potential of analyzing protein secondary structure in a single virus.

Theory and Experimental Validation of WIDE-MIP Detection.

WIDE-MIP is a highly sensitive vibrational detection platform based on infrared photothermal modulation of interferometric scattering. The schematic of the WIDE-MIP microscope is illustrated in FIG. 1(a). In previous implementation of widefield MIP, a visible LED was utilized as the probe light, which had a relatively long pulse duration of ~1 μs and only allowed detection of PMMA beads of 1.0 μm diameter. To match the nanosecond-scale thermal decay of nanoparticles (240 ns for 200-nm PMMA beads in air), we incorporated a nanosecond pulsed laser (for example, NPL52C, Thorlabs, pulse duration of 129 ns) as the visible probe to improve the sensitivity. A pulsed mid-infrared laser (for example, Firefly-LW, M Squared Lasers) excites the sample placed on a silicon substrate. The visible probe $E_i$ illuminates the sample and is further scattered by the sample $E_s$ and reflected by the substrate $E_r$. Compared to a transparent substrate, such as calcium fluoride, silicon reflects most of the forward-scattered light and increases the total back-scattering. Consequently, the scattered light is interfered with the reflected light and the resulting interferometric image represents the coherent sum of the scattered and reflected fields:

$$I_{det} = |E_r + E_s|^2 = |E_r|^2 + |E_s|^2 + 2|E_r||E_s|\cos\varphi \quad (1)$$

where φ is the phase difference between $E_s$ and $E_r$. The normalized interferometric contrast S is defined as:

$$S = \frac{I_{det} - I_{bkg}}{I_{bkg}} = \frac{|E_r + E_s|^2 - |E_r|^2}{|E_r|^2} = \frac{|E_s|^2}{|E_r|^2} + 2\frac{|E_s|}{|E_r|}\cos\varphi \quad (2)$$

where $I_{bkg}$ is the background intensity.

For particles of small size like viruses, $|E_r|^2 >> |E_s|^2$. Then, we have $$S \cong 2\frac{|E_s|}{|E_r|}\cos\varphi \quad (3)$$

The photothermal contrast C induced by IR absorption is generated from the interferometric contrast difference between IR on (hot) and IR off (cold) states:

$$C = \frac{2}{|E_r|}\left(E_s^{hot}\cos\varphi^{hot} - E_s^{cold}\cos\varphi^{cold}\right) \quad (4)$$

where $|E_r|$ is assumed as a constant in the modulation. For the purpose of brevity, only the change of $E_s$ is taken into account between hot and cold states and φ is considered as a constant in previous MIP work. However, for specular reflection, $E_r$ only travels in one direction and is reflected back along the optical axis, while $E_s$ travels in all directions, mostly at oblique angles. Due to thermal expansion of the particle, the travelling direction of $E_r$ relative to $E_s$ is different, and thus the phase angle φ is slightly different in hot and cold states. Because the phase angle φ also depends on the axial position of the optical focus, the MIP contrast can be optimized by tuning the focal position. To precisely control the Z-axis scanning, the objective is mounted on an objective piezo scanner for defocus-enhanced photothermal image acquisition (FIG. 1(b)). Other actuators may be used to adjust the relative distance between the sample and the objective, by moving the sample and/or the objective. Other suitable actuators can include motorized stages, voice coil, electrostrictive, magnetostrictive, microelectromechanical system (MEMS), ultrasonic, thermoelectric, electrohydraulic, stepper motors, linear motors, flexure-based, electrostatic, or any other actuator that produces translation in response to a control signal.

FIGS. 2(a) through 2(i) illustrate simulation and experimental validation of interferometric defocus-enhanced photothermal contrast, according to some exemplary embodiments. PMMA beads of D=200 nm were used as the testbed. FIG. 2(a) illustrates simulated defocus curves of interferometric contrast at the cold (T=293.15 K) and hot (T=373.15 K) states. Zoomed-in view of simulated defocus curves of interferometric contrast at the position of $Z_1$=0 μm (FIG. 2(b)) and $Z_2$=0.4 μm (FIG. 2(c)). Interfer.: Interferometric. The photothermal contrast is 0.6% at $Z_1$=0 μm and 0.00035% at $Z_2$=0.4 μm. FIG. 2(d) illustrates simulated interferometric images at $Z_2$=0.4 μm, $Z_1$=0 μm (left) and interferometric scattering along Z axis (right). FIG. 2(e) illustrates simulated MIP images at $Z_2$=0.4 μm, $Z_1$=0 μm (left) and MIP imaging along Z axis (right). FIG. 2(f) illustrates experimental interferometric images at $Z_2$=0.4 μm, $Z_1$=0 μm (left) and interferometric scattering along Z axis (right). FIG. 2(g) Illustrates experimental MIP images at $Z_2$=0.4 μm, $Z_1$=0 μm (left) and MIP imaging along Z axis (right). Scale bar: 500 nm. All Z axis images are obtained from Z=−1 to 1 μm. FIG. 2(h) illustrates simulated and FIG. 2(i) illustrates experimental defocus curves of interferometric and MIP contrast. Power before the objective: pump: 48 mW at 1728 cm$^{-1}$, probe: ~1 mW. Image acquisition time: 2.36 s per image. Z-axis scanning step: 100 nm.

Figures 7A, 7B:
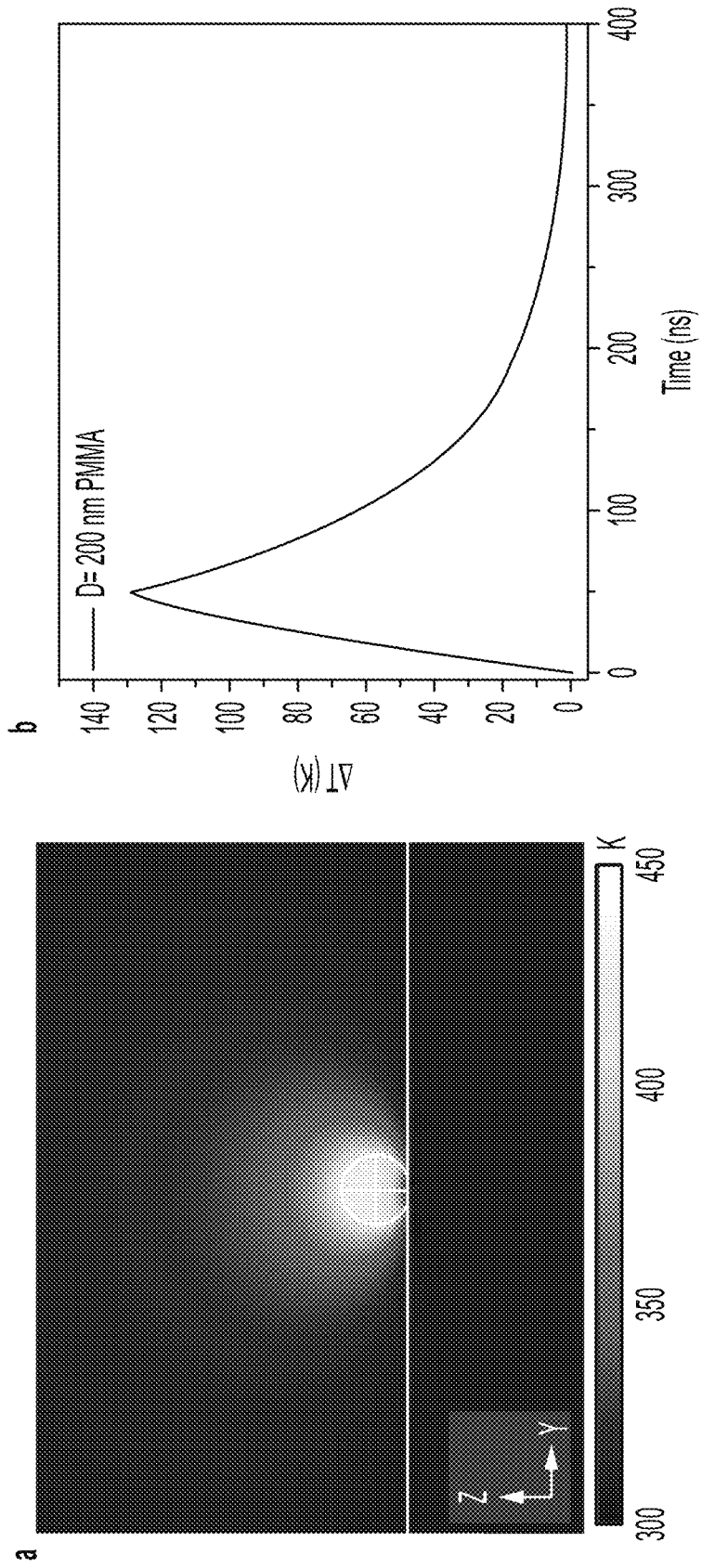
FIGS. 7(a) and 7(b) illustrate simulated temperature rise of a 200 nm PMMA bead under single IR pulse heating, according to some exemplary embodiments.

FIGS. 7(a) and 7(b) illustrate simulated temperature rise of a 200 nm PMMA bead under single IR pulse heating, according to some exemplary embodiments. FIG. 7(a) illustrates temperature distribution of a 200 nm PMMA bead on the silicon substrate heated by a single IR pulse. Time is at 400 ns after the rising edge of the IR pulse. FIG. 7(b) illustrates simulation results of thermodynamic properties of the heated PMMA bead.

To validate the interferometric phase difference, the interferometric image of a 200 nm diameter (D) PMMA bead was numerically simulated via the boundary element method (BEM). Interferometric contrast S is then calculated using the metallic nanoparticle boundary element method (MNPBEM) toolbox. The MIP signal is generated from the interferometric contrast difference between IR on (hot) and IR off (cold) states. The transient temperature difference between hot and cold states is set be ~80 K over a temporal window of 129 nanoseconds (duration of probe pulse), which is calculated from COMSOL simulation (FIGS. 7(a) and 7(b), details in Additional Note 1). We simulated the interferometric images of the 200 nm PMMA bead at both cold (T=293.15 K) and hot (T=373.15 K) states along the Z-axis focus of the objective. The interferometric contrast at the center of the diffraction-limited image of the PMMA bead on a silicon substrate is calculated as the focus position Z is swept. Here, Z is set to be zero for exact optical focusing at the sample-substrate interface for the light-collecting objective. As shown in FIG. 2(a), the simulated defocus curves of cold and hot contrasts have a similar sinusoidal function shape, both of them reaching the maximum contrast near Z=0.4 μm. For the hot state, the increased local temperature changes the opto-physical properties of the PMMA particle, such as size (r) and refractive index (n). As seen from the zoomed-in view at different focal planes, the slopes of the interferometric contrast vary greatly as a function of Z (FIGS. 2(b) and 2(c)). The interferometric contrast is least sensitive to the axial focus when the particle contrast is maximized at Z=0.4 μm. Consequently, the photothermal contrast is only 0.00035% at Z=0.4 μm (FIG. 2c). On the contrary, the interferometric contrast is most sensitive to the change in opto-physical properties of the particle caused by the local temperature increase near the interface at Z=0 μm, where the photothermal contrast is about 0.6% at ΔT=80 K (FIG. 2b). Therefore, the difference between cold and hot state, defined as the MIP contrast, is maximized at a defocused plane relative to the interferometric contrast. The interferometric image shows a bright contrast at the focal plane of Z=0.4 μm, where the MIP contrast is low. The MIP image reaches its maximum contrast at Z=0 μm, where the interferometric image shows a negative contrast (FIGS. 2(d) and 2(e)).

To experimentally validate the mechanism of interferometric defocus-enhanced MIP of the current disclosure, D=200 nm PMMA beads on a silicon substrate were used. We first used the interferometric contrast (IR off) to locate the beads under the microscope. Once the beads were observed in the focal plane, the IR laser was turned on to 1728 cm$^{-1}$, which corresponds to the acrylate carboxyl vibration (C=O stretching) in PMMA. To optimize the MIP contrast, we manually adjusted the defocus with a piezo scanner. Subsequently, a series of interferometric and MIP images of the PMMA beads were acquired by scanning the focal position of the objective lens. As shown in FIGS. 2(f) and 2(g), the experimental images match the simulation results very well.

Figures 8A, 8B, 8C, 8D:
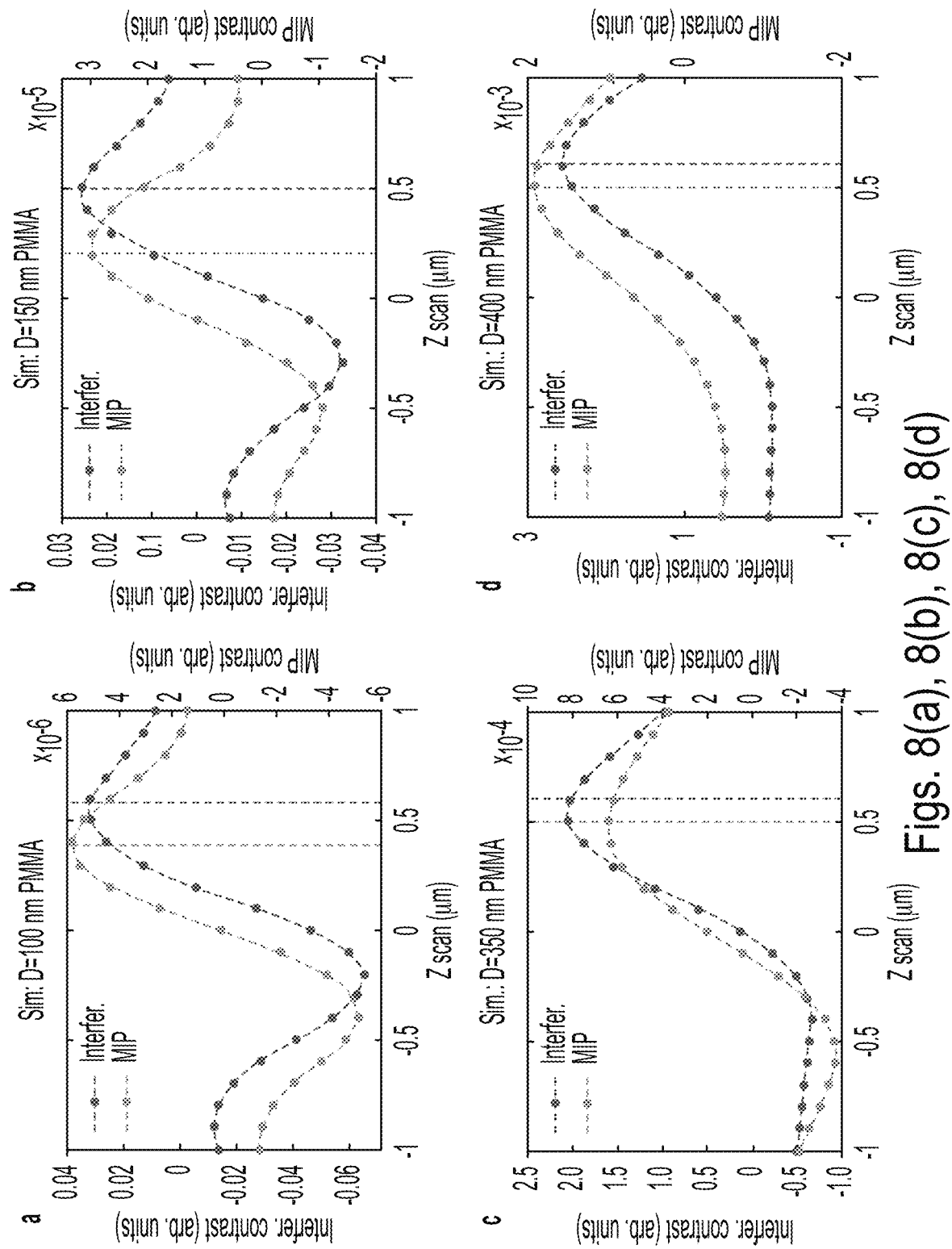
FIGS. 8(a) through 8(h) illustrate interferometric defocus enhancement of MIP contrasts of PMMA beads with different sizes, according to some exemplary embodiments.
Figures 8E, 8F, 8G, 8H:
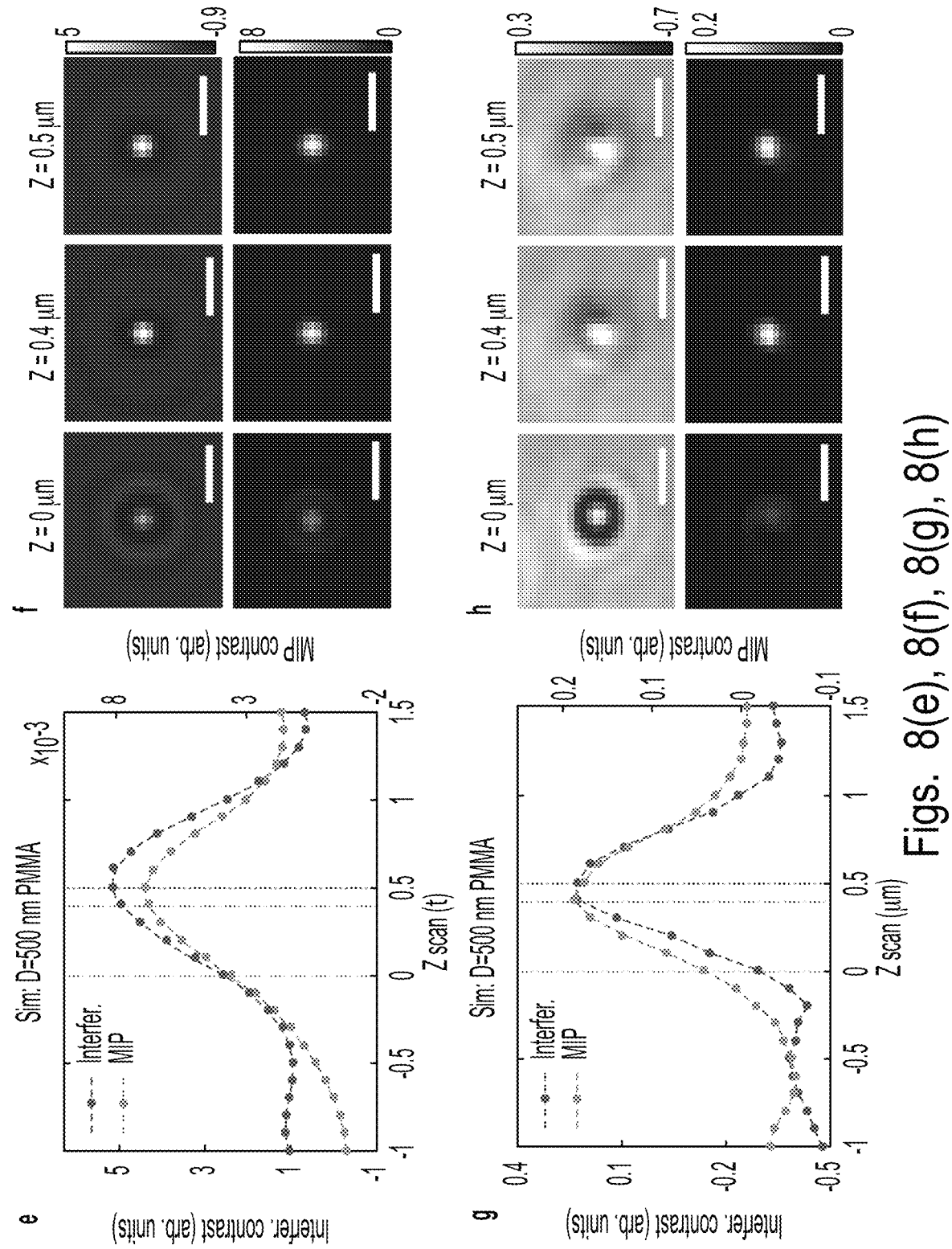

To derive the optimal condition for MIP imaging, we plotted the interferometric and MIP contrasts as a function of optical focus position through both simulation (FIG. 2h) and experiment (FIG. 2i). The simulated focal plane difference between interferometric and MIP images, ΔZ=400 nm, is highly consistent with the experimental result. By defocusing the interferometric images, the MIP contrast is increased by 2.5 times for 200 nm PMMA particles. For PMMA beads with different sizes, the defocus curve and ΔZ have different shapes and values (FIG. 8), details in Additional Note 2). Thus, this framework provides a guideline to obtain a well-defined and optimized photothermal detection signal by adjusting the focus for MIP detection of nanoparticles with different sizes.

Hyperspectral Performance and Spectral Fidelity.

FIGS. 3(a), 3(b), and 3(c) illustrate hyperspectral performance and spectral fidelity of WIDE-MIP microscopy, according to some exemplary embodiments. MIP image of D=200 nm PMMA beads with IR excitation at 1452 cm$^{-1}$ (FIG. 3(a)) and 1728 cm$^{-1}$ (FIG. 3(b)). Scale bars: 5 μm. Experiments were repeated at least 3 times. FIG. 3(c) illustrates MIP spectrum (lower curve) and FTIR spectrum (upper curve) of D=200 nm PMMA beads. n=30 for biologically independent PMMA beads. Error bands represent standard deviation of the mean. Power before the objective: pump: 31.4 mW at 1452 cm$^{-1}$, 38.6 mW at 1728 cm$^{-1}$, probe: ~1 mW. Image acquisition time: 2.36 s per wavenumber. The MIP spectrum was normalized by the IR power. The FTIR spectrum was acquired by an attenuated total reflection FTIR spectrometer. Source data are provided as a Source Data file.

Figures 9A, 9B, 9C, 9D, 9E, 9F:
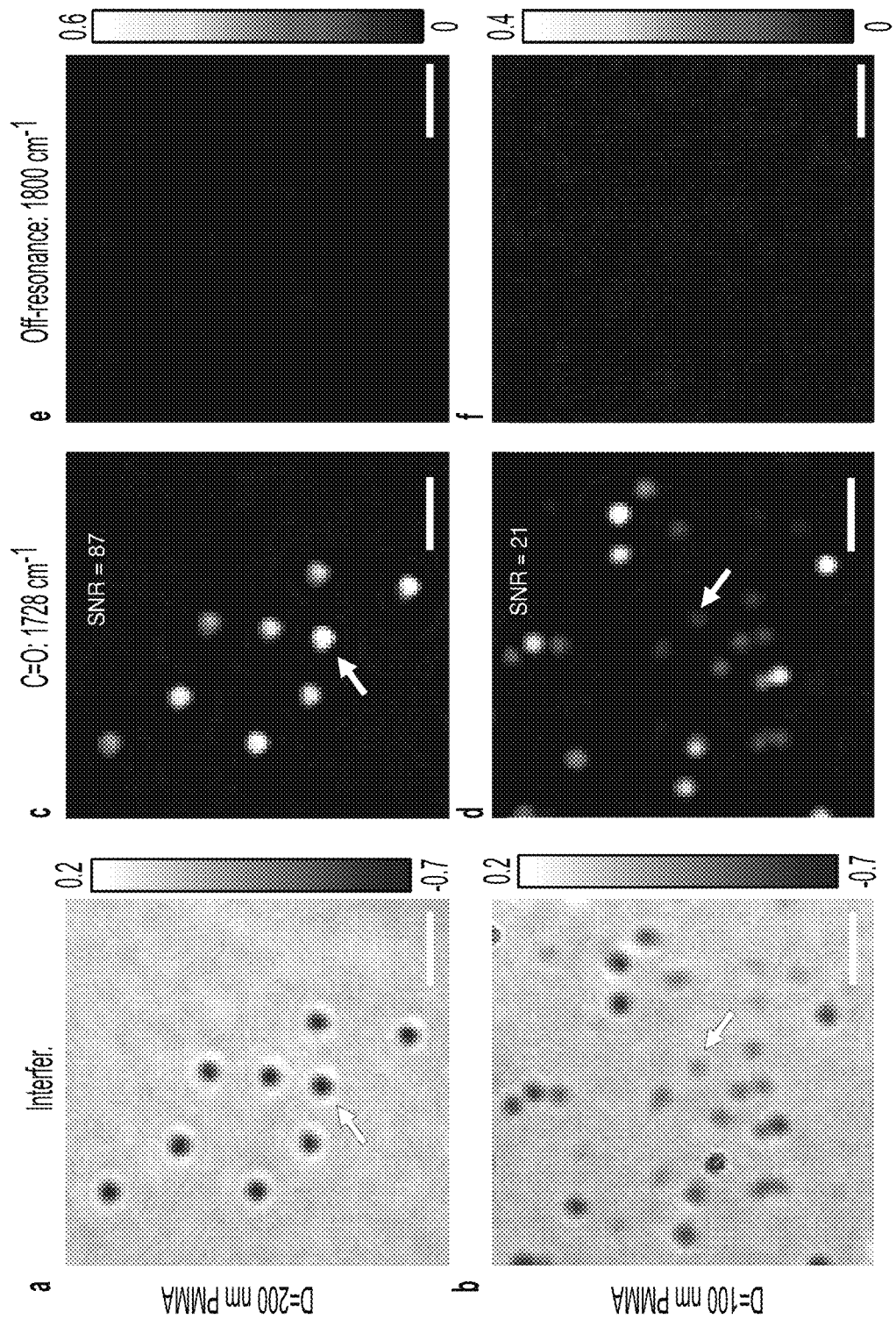
FIGS. 9(a) through 9(f) illustrate detection limit of WIDE-MIP imaging, according to some exemplary embodiments.
Figures 10A, 10B, 10C, 10D:
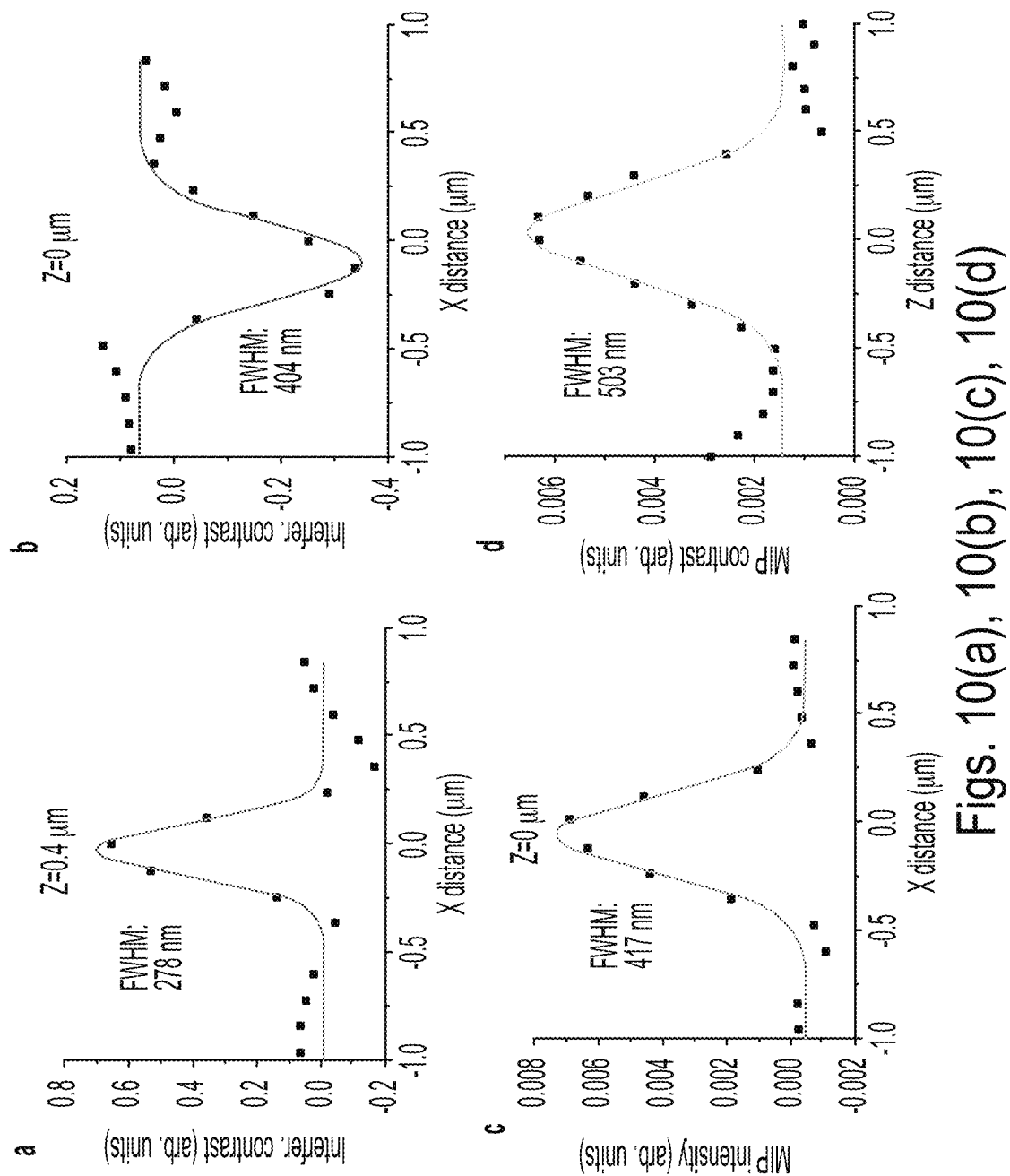
FIGS. 10(a) through 10(d) illustrate spatial resolution of WIDE-MIP imaging, according to some exemplary embodiments.

To further test the capability of WIDE-MIP for spectroscopic imaging of single virus in the fingerprint window, we evaluated the hyperspectral performance and spectral fidelity of the system. Single 200-nm PMMA beads with known IR absorption spectrum were chosen for their similar size and dielectric constant (n≈1.5) to the Monkeypox viruses. FIGS. 3(a) and 3(b) show MIP images of the beads at 1452 cm$^{-1}$ and 1728 cm$^{-1}$, indicating bond-selective contrast from the C—H and C═O stretching of PMMA. The statistical spectra of 30 individual beads showed the distinguished resonance peaks of both C—H and C═O stretching vibrations (FIG. 3(c), lower curve). The standard deviation of the mean MIP contrast within the range of ~1510 to 1610 cm$^{-1}$ was found to be ~0.16%, which corresponds to the off-resonance region of PMMA vibration. This demonstrates the stable hyperspectral performance of WIDE-MIP. Furthermore, the spectral fidelity was confirmed by comparing the WIDE-MIP spectrum to FTIR absorption spectrum of PMMA (FIG. 3(c), upper curve). With the increased MIP contrast, WIDE-MIP realizes the high-speed widefield photothermal detection of D=100 nm PMMA nanoparticles (FIGS. 9(a) through 9)f), additional details in Additional Note 3), which increases the throughput by three orders of magnitude compared with scanning MIP at a similar level of SNR (Table 1).

Fingerprinting and Base Residue Detection of Single DNA and RNA Viruses.

FIGS. 4(a) through 4(r) illustrate fingerprinting detection of single VACV and VSV viruses, according to some exemplary embodiments. FIG. 4(a) illustrates defocused interferometric scattering, FIG. 4(b) illustrates fluorescence, and FIG. 4(c) illustrates merged images of single VACV viruses. FIG. 4(d) illustrates amide II bond-selective image of the same area with the pump at 1544 cm$^{-1}$. FIG. 4(e) illustrates amide I bond-selective image of the same area with the pump at 1656 cm$^{-1}$. FIG. 4(f) illustrates off-resonance image showed no contrast. FIG. 4(g) illustrates defocused interferometric scattering, FIG. 4(h) illustrates fluorescence, and FIG. 4(i) illustrates merged images of single VSV viruses. FIG. 4(j) illustrates amide II bond-selective image of the same area with the pump at 1552 cm$^{-1}$. FIG. 4(k) illustrates amide I bond-selective image of the same area with the pump at 1656 cm$^{-1}$. FIG. 4(l) illustrates off-resonance image showed no contrast. Scale bars: 10 μm. FIG. 4(m) illustrates MIP spectra of two single VACV and VSV viruses (blue and red arrows labeled). Statistical MIP spectra obtained from 36 single VACV (FIG. 4(n)) and 33 VSV viruses (FIG. 4(o)). Error bands represent standard deviation of the mean. Power before the objective: pump: 22.9 mW at 1544 cm$^{-1}$, 29.1 mW at 1552 cm$^{-1}$, 34.5 mW at 1656 cm$^{-1}$, 35.8 mW at 1768 cm$^{-1}$, probe: ~1 mW. Image acquisition time: 2.36 s per wavenumber. The MIP spectrum is normalized by the IR power. Quantified MIP contrast of peaks at T residue (P=0.138892) (FIG. 4(p)) and U residue (P=7.4×10$^{-5}$) (FIG. 4(q)) of VACV and VSV. FIG. 4(r) illustrates quantified MIP contrast ratio of peaks at T residue/U residue (P=5.2×10$^{-14}$) of VACV and VSV. n=36 for biologically independent VACV samples and n=33 for biologically independent VSV samples in FIGS. 4(p) through (r). The bound of box indicates 25% to 75% of data; inner line indicates medium; whiskers indicate maxima and minima of data. All statistical significance was analyzed using two-sided Student's t test. ns (P≥0.05) denotes no statistically significant difference. (P<0.0001) denotes statistically significant difference.

With the high-resolution and high-throughput capability, WIDE-MIP opens the possibility of single-virus chemical detection. We used single VACV and VSV viruses as testbeds. The dimensions of the VACV virion are roughly 360×270×250 nm. VSV is a bullet-shaped RNA virus with a smaller size of 80×180 nm. FIG. 4(a) shows the defocused interferometric scattering image of single VACV viruses. It should be noted that the depth of focus for MIP imaging is 503 nm and the spatial resolution is 417 nm, measured from a 200 nm PMMA particle in MIP image captured at the defocus plane of Z=0 μm (FIGS. 10(a) through 10(d), additional details in Additional Note 4). To confirm MIP imaging of single viruses, both VACV and VSV viruses were expressed with an enhanced green fluorescent protein (cGFP) envelope for an orthogonal validation. With the good overlay of the widefield fluorescence imaging (FIG. 4(b)) and the interferometric scattering images (FIG. 4(c)), we confirmed that the observed particles were indeed VACV virions. Atomic force microscope analysis further confirmed the size of single virions (FIGS. 11(a) through 11(c), additional details in Additional Note 5). Bond-selective MIP imaging showed the amide II (1544 cm$^{-1}$) and amide I (1656 cm$^{-1}$) vibrational contrasts contributed by viral proteins (FIGS. 4(d) and 4(e)), whereas the off-resonance images at 1768 cm$^{-1}$ showed no contrasts (FIG. 4(f)). Similar results of single VSV viruses are shown in the defocused interferometric scattering, fluorescence, and MIP images (FIGS. 4(g) to 4(l)). As VSV is less concentrated on the imaging plate than VACV due to the preparation procedure, additional data is provided in FIGS. 12(a) through 12(l).

To provide further insight into the viral structure and content, we performed WIDE-MIP hyperspectral imaging of single VACV and VSV viruses (arrows labeled in FIGS. 4(a) to 4(l)). Obvious differences were overserved in the single-virus fingerprints (FIG. 4(m)). Merited from the high-throughput ability of spatial multiplexing of WIDE-MIP, spectral analysis of multiple viruses was performed. The statistical spectra of both VACV (n=36) and VSV (n=33) (FIGS. 4(n) and 4(o)) are in good agreement with the single-virus spectra (FIG. 4(m)). Besides the viral protein vibrations, some unique peaks reveal the information of the viral nucleic acids. Different from the wide amide I peak from the pure protein samples (FIG. 13(a)), the strongest sharp peak at 1656 cm$^{-1}$ is contributed by a superposition of the the viral protein, adenine (A) and T residue vibrations in viral DNA of VACV (FIG. 4(n)). A medium feature at 1580 cm$^{-1}$ is assigned to the T residue vibration in VACV viral DNA. For VSV, the U residue vibration in RNA is indicated by the strong peak at 1640 cm$^{-1}$ (FIG. 4(o)). More detailed features of nucleic acids in VSV are revealed by the weak peak at 1604 cm$^{-1}$ (A and cytosine (C)) and strong peak at 1656 cm$^{-1}$ (A and proteins). The guanine (G) residue vibrations are identified at 1692 cm$^{-1}$ in both VACV and VSV. The assignments of the chemical components were validated by the pure protein, DNA and RNA film samples (FIGS. 13(a)-13(c)), details in Additional Note 6). It indicates that WIDE-MIP can provide rich chemical content information of viral proteins and even nucleic acids inside a single virus.

To further demonstrate the potential of WIDE-MIP to differentiate single RNA viruses from single DNA viruses, we compared the signature peaks of nucleic acids at the single-virus level by quantifying the MIP contrast of peaks at T residue and U residue for VACV and VSV to highlight the spectroscopic difference of DNA and RNA viruses. Although the MIP contrasts of VACV and VSV shows no statistically significant difference at 1580 cm$^{-1}$ representing U residue (FIG. 4(p), P=0.138892), MIP contrasts of both T residue (FIG. 4(q), P=7.4×10$^{-5}$) and the ratio of T/U (FIG. 4(r), P=5.2×10$^{-14}$) show significant difference between VACV and VSV. Our results show that fingerprint WIDE- MIP has the potential to rapidly classify RNA and DNA viruses in clinic by bond-selective imaging of T and U residues.

Identification of Protein Secondary Structure in a Single Virus.

Figures 5A, 5B, 5C, 5D, 5E, 5F, 5G, 5H, 5I:
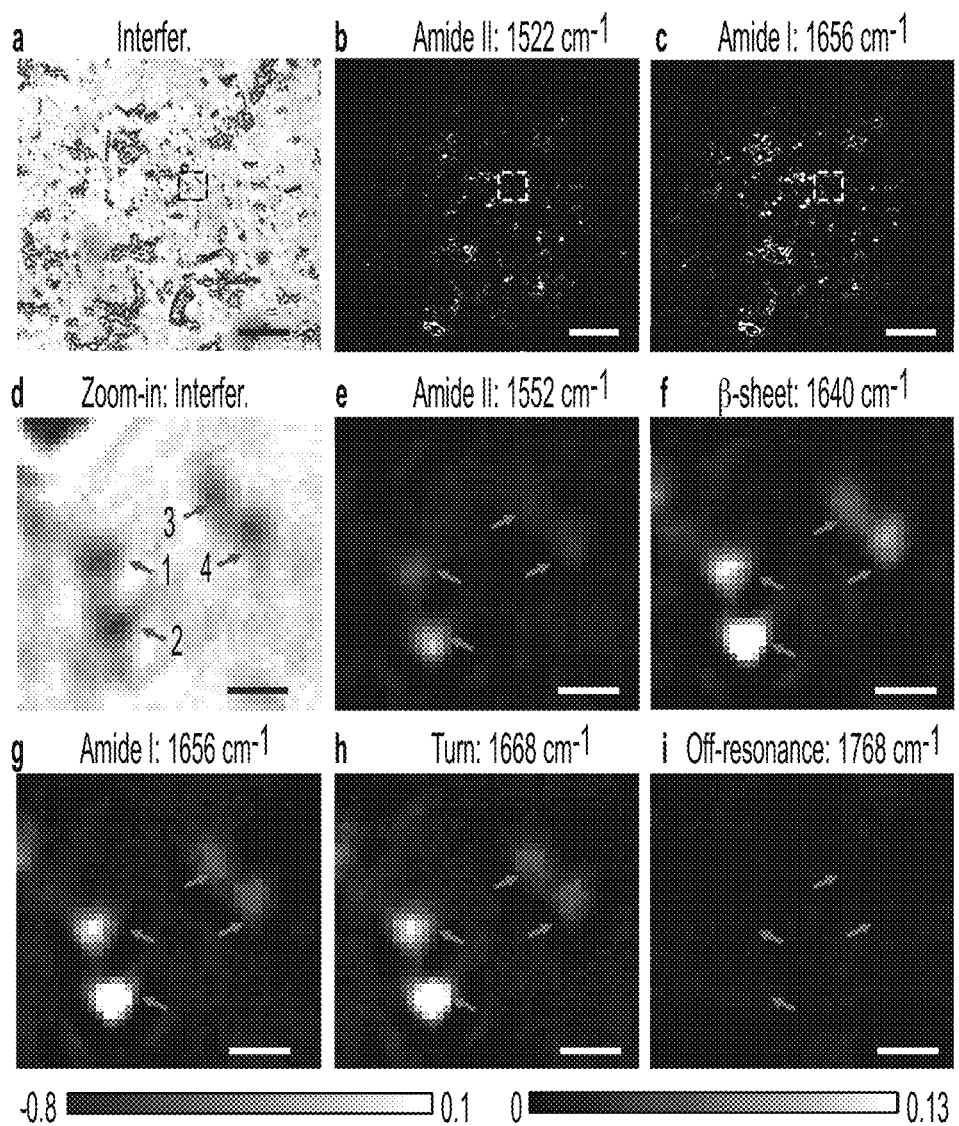

FIGS. 5(a) through 5(l) illustrate protein secondary structure identification in single VZV viruses, according to some exemplary embodiments. FIG. 5(a) illustrates defocused interferometric scattering, FIG. 5(b) illustrates amide II and FIG. 5(c) illustrates amide I bond-selective image of single VZV viruses with the pump at 1552 cm$^{-1}$ and 1656 cm$^{-1}$, respectively. Scale bars: 10 µm. FIG. 5(d) illustrates zoomed-in view of defocused interferometric scattering of four viruses in FIG. 5(a). FIG. 5(e) illustrates amide II, FIG. 5(f) illustrates β-sheet, FIG. 5(g) illustrates amide I, FIG. 5(h) illustrates turn bond-selective image of the same area in FIG. 5(d) with the pump at 1552 cm$^{-1}$, 1640 cm$^{-1}$, 1656 cm$^{-1}$, 1668 cm$^{-1}$, respectively. FIG. 5(i) illustrates off-resonance image showed no contrast of the same area in FIG. 5(d) with the pump at 1768 cm$^{-1}$. Scale bars: 1 µm. FIG. 5(j) illustrates MIP spectra of four VZV viruses in FIG. 5(d) (arrows labeled). FIG. 5(k) illustrates statistical MIP spectra obtained from 30 single VZV viruses. Error bands represent standard deviation of the mean. Power before the objective: pump: 29.1 mW at 1552 cm$^{-1}$, 33.1 mW at 1640 cm$^{-1}$, 34.5 mW at 1656 cm$^{-1}$, 34.1 mW at 1668 cm$^{-1}$, 35.8 mW at 1768 cm$^{-1}$, probe: ~1 mW. Image acquisition time: 2.36 s per wavenumber. The MIP spectrum is normalized by the IR power. FIG. 5(l) illustrates FTIR spectrum of pure VZV virus powder. The FTIR spectrum was acquired by an attenuated total reflection FTIR spectrometer. Source data are provided as a Source Data file.

As the profile in the amide I band is very sensitive to the protein secondary structures, WIDE-MIP can be a promising tool to characterize the protein structures compared to expensive and time-consuming approaches such as electron microscopy. To explore such potential, we acquired the WIDE-MIP spectra of another DNA virus, VZV, shown in FIGS. 5(a)-5(l). It is reported that there are three envelope proteins, glycoprotein B, glycoprotein H and glycoprotein L serving as the most essential VZV proteins that function as the core fusion complex[56]. These proteins have known 3D structure and all of them have a big proportion of β-sheet, and the proportion of turn cannot be ignored. FIGS. 5(a) to 5(c) show the defocused interferometric scattering image and bond-selective MIP image of amide II and amide I vibrations of single VZV viruses. Although there are some aggregates in the interferometric image, a lot of single virions are shown. Zoomed-in views of four single VZV virus are illustrated in FIGS. 5(d) to 5(i). WIDE-MIP spectra of these four single VZV (red arrows labeled in FIGS. 5(d) to 5(i)) were further obtained (FIG. 5(j)). The specific IR peaks of DNA virus were observed at 1580 cm$^{-1}$ and 1612 cm$^{-1}$, indicating the vibrations of A, C and T residues in the viral DNA of VZV. Compared to the spectra of VSV and VACV, two broad peaks are observed at around 1630-1640 cm$^{-1}$ and 1668 cm$^{-1}$, which are assigned to the β-sheet and the turn structure in the viral proteins of VZV, respectively. The statistical spectra acquired from 30 VZV virions (FIG. 5(k)) further reveals an enriched β-sheet protein components, viral DNA and lipids in VZV (details in Additional Note 6). The spectral fidelity was confirmed by FTIR absorption spectrum of VZV powder (FIG. 5(l)). Therefore, besides the detection of major chemical components, WIDE-MIP can identify the protein secondary structure related to their function in a virus.

DISCUSSION

Described herein in detail in connection with the present disclosure is a single virus fingerprinting approach, termed WIDE-MIP microscopy, that addresses the unmet need for identification of single virus. The approach of the disclosed technology allows composition detection of viral nucleic acids and proteins with high-throughput. A theoretical framework for interferometric defocus-enhanced photothermal signal is developed and validated, providing a guideline to obtain a well-defined photothermal signal by adjusting the defocusing. Compared to scanning MIP, WIDE-MIP increases the imaging throughput by three orders of magnitude for fingerprint analysis of nanoparticles at the same SNR. Besides content detection of viral proteins, viral DNA and viral RNA, WIDE-MIP further identifies the protein secondary structure in single virus by revealing enriched β sheet components.

While defocused interferometric imaging to improve MIP contrast is utilized, the analysis of biological samples relies on MIP contrasts, whereas the interferometric images are solely used for sample localization before acquiring the MIP images. Despite the slight defocusing in the interferometric images, the MIP images remain in focus, revealing distinct contrasts of the biological samples. The MIP images not only provide valuable morphological information of the biological samples, but also offer insightful biochemical details about their specific contents.

In this work, both VACV and VSV viruses were expressed with an eGFP envelope. The eGFP was fused to the VSV G protein, where each VSV contains ~1,200 molecules of the G protein on the viral surface. With the formed G protein and G-eGFP fusion protein heterodimers, there are ~600 eGFP molecules on the surface of a single virus. Comparing the size of eGFP (2.4×4.2 nm) to that of the VSV virus (80×180 nm), we estimate that only 1.3% of a single VSV virus consists of eGFP. Thus, the effect of eGFP on MIP imaging should be negligible due to the relatively low content of eGFP in a single virus.

Supporting this notion, eGFP has a β-enriched sheet structure, while no obvious β sheet chemical signature was observed in either VACV or VSV expressing eGFP in FIGS. 4(a)-4(r). Additionally, the pure VZV viruses without any labeling showed an enriched β sheet component. These findings further support that the effect of eGFP on MIP imaging is minimal. Moreover, we note that the key distinction between DNA and RNA viruses lies in the different nucleic acid peaks associated with T and U residue vibrations, which is also unrelated to the eGFP proteins.

For the analysis of actual virus samples, label-free methods may be more suitable for diagnostic purposes. Thus, in this work, we firstly performed fluorescence-guided MIP analysis of single viruses by integrating fluorescence imaging and MIP imaging for accurate virus identification via WIDE-MIP (FIGS. 4(a)-4(r)). Subsequently, we performed MIP imaging and obtained fingerprint spectra of unlabeled pure VZV viruses to achieve label-free detection of single viruses (FIGS. 5(a)-5(l)) These approaches allow for comprehensive analysis while minimizing any potential influence of fluorescence labeling on the MIP imaging results.

In comparison to recently reported fluorescence-detected MIP (F-MIP) microscopy, WIDE-MIP offers a distinct advantage in detecting bionanoparticles with low levels of expressed fluorescence tags (FIGS. 14(a) to 14(d), details in Additional Note 7). Although the photobleaching of aggregated cGFP-VACVs showed a similar level in F-MIP[60] (<~10%), severe photobleaching was observed in single VACVs (>~95%). This photobleaching of single viruses limits the detection of photothermal modulation and acquisition speed. Considering that the MIP signal relies on the difference in fluorescence intensity between the IR-on (hot) and IR-off (cold) states, this severe bleaching at the single-virus level further compromises the reliability of F-MIP. Instead, we focused on fluorescence-guided WIDE-MIP analysis, which enables label-free chemical imaging of single viruses.

Benefit from the compositional analysis of single viruses in a label-free manner, we envision WIDE-MIP as an alternative analysis tool for viral vectors used in gene therapy. Viral vectors, including adeno-associated viruses, adenoviruses, and lentiviruses, are increasingly used in gene therapy but pose challenges for quality control testing and characterization due to their complexity. To ensure a safe, consistent, and high-quality product, accurate and rapid analytical assays are needed to monitor quality attributes. Sodium dodecyl-sulfate polyacrylamide gel electrophoresis, mass spectrometry, immunoblotting, enzyme-linked immunosorbent assay, polymerase chain reaction, or transmission electron microscopy are used to identify protein, genome and capsid content, but these assays can be time-consuming and require pre-treatments or extraction. To address these limitations, we further demonstrated high-speed chemical imaging of single VACV by reducing the acquisition time to 0.32 s per image per wavenumber of single viruses and the SNR of one single VACV is ~4 within the field of view of 24 by 24 μm (FIGS. 15(a) to 15(c)). With the ability to rapidly acquire fingerprints of single viruses, WIDE-MIP can provide insights into the quality control of viral vectors, such as their identity, purity, and stability[64] (details in Additional Note 8).

Future improvement for WIDE-MIP can focus on fingerprinting viruses or exosomes in liquid conditions, allowing for detecting biological nanoparticle samples in their natural states. This can be achieved by incorporating microfluidic systems and designed substrates to capture viruses and enhance imaging contrast in liquid measurements, which will broaden the applicability of WIDE-MIP to real-world applications.

Materials. According to the current disclosure a double-side polished silicon wafer (4 inch, 500 μm thickness) was purchased from University Wafer and diced into 10 mm×20 mm pieces. PMMA nanoparticles were purchased from Phosphorex. 0.1% poly-1-lysine and bovine serum albumin (BSA) were purchased from Sigma-Aldrich. Inactivated varicella zoster virus strain VZ-10 was purchased from Fisher Scientific.

Lab-built WIDE-MIP microscope. The IR pump beam was generated by a tunable (from 1400 to 1800 $cm^{-1}$) mid-IR laser (for example, Firefly-LW, M Squared Lasers) operating at 20 kHz repetition rate with a ~20 ns pulse duration. The pump pulses were modulated by an optical chopper (for example, MC2000B, Thorlabs). For the wide-field photothermal imaging, the IR beam was weakly focused on the sample plane from the bottom of the silicon substrate via an off-axis parabolic mirror. A delay pulse generator (for example, 9254, Quantum Composers) was used to synchronize the pump pulse, the probe pulse and the interferometric pulse recorded by the camera. For the power normalization, a power meter (for example, PM16-401, Thorlabs) was used to monitor the IR power. The visible probe was provided with a pulsed 520 nm nanosecond laser (for example, NPL52C, Thorlabs) with a pulse duration of 129 ns. The probe laser illuminated the sample from the top through a 50/50 polarizing beam splitter, a quarter-wave plate and a high numerical aperture (NA) air objective (for example, MPLFLN Olympus, 100×, NA 0.9). To acquire the defocus-enhanced photothermal images, the objective was adapted with an objective piezo scanner (for example, Piczosystemjena, MIPOS 100), which can provide precise Z-axis scanning in steps of 100 nm. The incident light was then scattered by the sample and reflected by the silicon substrate. The consequent interferometric scattering was collected by the same objective and recorded by a complementary metal-oxide semiconductor (CMOS) camera (for example, Q-2HFW, Adimec). We further employed a 2 million well-depth camera to receive sufficient probe photons at each pixel.

Theoretical simulation. According to the current disclosure, a theoretical framework was developed to calculate the focus-dependent interferometric and photothermal images of nanoparticles of different sizes. An image field representation of optical fields was employed by considering imaging optics and system parameters. The simulation was built upon the previously developed model via the boundary element method (BEM), which is a computationally efficient approach for calculating the interferometric scattering from a nanoparticle near a substrate. A custom-developed metallic nanoparticle boundary element method (MNPBEM) toolbox was used to solve Maxwell's equations for a dielectric environment where the nanoparticles have homogeneous and isotropic dielectric functions and are separated by abrupt medium interfaces. The MNPBEM was implemented in MATLAB and the simulation could be compartmentalized into five steps: (1) dielectric functions initialization of nanoparticle, substrate and environment to define the system geometry, such as the radius (r) and refractive index (n) of the nanoparticle; (2) specification of excitation scheme, such as incident illumination wavelength ($\lambda$) and illumination function; (3) solver setup for the BEM equations; (4) BEM equations' solutions for the given excitation; (5) calculation of the far-field scattered field and image fields of the nanoparticle. We assumed that a PMMA particle (r, n=1.49) was placed on top of a silicon substrate (n=4.2). The interferometric scattered field was calculated as the total backscattered field considering the reflections from the silicon surface using Green's functions. The image fields were then simulated via angular spectrum representation integral and the detected interferometric signals were calculated according to equation (2). The photothermal signals were then generated from the interferometric scattering difference between IR on (hot) and IR off (cold) states. We simulated the interferometric images of a PMMA bead with different sizes at both cold (T=293.15 K) and hot (T=373.15 K) states along the Z-axis scanning of objective. The interferometric and photothermal contrasts were recorded at the center of the diffraction-limited image of the PMMA bead as the focus position Z sweeping. Here, Z was set to be zero for exact optical focusing at the sample-substrate interface for the light-collecting objective, where the numerical aperture of the objective was also considered for the collecting angle. Thus, the defocus curves of both interferometric and photothermal contrasts were obtained.

Fluorescence imaging of single virus. A 488 nm diode laser (200 mW, Cobolt 06-MLD) was used for fluorescence excitation. The excitation beam was expanded through a 4-f system ($f_1$=50 mm, LA1131-A-ML and $f_2$=300 mm, LA1484-A-ML, Thorlabs) and then coupled into the light path of probe laser. The fluorescence emission went through the same objective lens and was collected with a filter set (Excitation filter: FES0500, Thorlabs; Dichroic beam splitter: Di03-R405/488/532/635-t1-25×36, Sermock; Emission filter: FF01-525/30-25, Sermock). A CMOS camera (FLIR, Grasshopper3GS3-U3-51S5M) was used to capture the fluorescence images and the exposure time was set to 5 s for optimized contrast. Virus samples on silicon substrate were first imaged by fluorescence to confirm the single virus and then imaged with WIDE-MIP at the same position.

Data processing. The interferometric and MIP images were acquired using a lab-built Labview program and analyzed with ImageJ. The interferometric images were captured at a camera shutter speed of 1270 Hz. The MIP images were obtained as the intensity difference between the hot and the sequential cold frame, at the speed of 635 frames/s. The interferometric images were normalized by the background reflection. Pseudocolor was added to the MIP and fluorescent images with Image J software or MATLAB. The SNR was calculated from the ratio between the mean value of the center region (25 pixels) of the single particle in resonance photothermal image and the standard deviation of the off-resonance photothermal.

Sample preparation. The silicon wafers were cleaned in sequence with acetone, ethanol, and deionized (DI) water rinse. For PMMA nanoparticle detection, the PMMA beads were diluted ~100 times with DI water and then spin-coated on the silicon substrate and dried in air. For virus analysis, the VACV and vesicular stomatitis virus (VSV) samples were prepared according to the previous method. Both the recombinant VSV expressed an enhanced green fluorescent protein (eGFP) and VACV expressed Venus. To load viruses onto the substrate, the silicon surface was incubated with 0.1% poly-1-lysine for 1 h. Then, 100 µL of either VACV or VSV stock was incubated in the center of each poly-L-lysine coated silicon for 1 h at room temperature. Both VACVs and VSVs were diluted to ~1×10$^8$ PFU/mL. All virions were crosslinked and inactivated using 1.0 mL of 4% formaldehyde for 1 h. After modification, the substrate was rinsed with sterile filtered DI water and then dried in air. For varicella-zoster virus (VZV) detection, the lyophilized VZV pellet was dissolved in 200 µL PBS and filtered by a 0.22 µm filter. Then, 100 µL of VZV stock was incubated in the center of each poly-L-lysine coated silicon for 1 h at room temperature. After modification, the substrate was rinsed with sterile filtered DI water and then dried in air. To fabricate the pure protein film sample, 10 µL 10 mg/mL BSA solution was dropped onto the silicon surface and dried in air. The pure DNA and RNA solutions were prepared from the cDNA of melanoma cell and ssRNA of T24 cell, respectively, as described earlier[68]. The pure DNA and RNA films were prepared by dropping 5 µL cDNA and ssRNA onto the silicon surface, repectively, and dried in air.

Cell Lines. Melanoma cell line (1205Lu) was obtained from Dr. Meenard Herlyn (The Wistar Institute). T24 cell line (Cat #: HTB-4) was purchased from the American Type Culture Collection (ATCC). All cell lines were authenticated and tested to be *mycoplasma* negative.

FTIR measurement. The FTIR spectra of 200-nm dry PMMA beads and viruses were measured on an attenuated total reflection FTIR spectrometer (Nicolet *Nexus* 670, Thermo Fisher Scientific). The spectra resolution is 2 cm$^{-1}$ and each spectrum was measured with 128 scanning. All spectra were automatically normalized by the baseline correction on the system.

Statistics & Reproducibility. All experiments were independently repeated at least 3 times with similar results. Sample sizes were determined for each experiment based on well-established standards in the field. No statistical method was employed to predetermine sample size. All data collected during the experiments were included, no data were excluded from the analyses.

FIGS. 8(*a*) through 8(*h*) illustrate interferometric defocus enhancement of MIP contrasts of PMMA beads with different sizes, according to some exemplary embodiments. Specifically, the figures illustrate simulated defocus curves of interferometric and MIP contrasts of single (FIG. 8(*a*)) D=100 nm, (FIG. 8(*b*)) D=150 nm, (FIG. 8(*c*)) D=350 nm, (FIG. 8(*d*)) D=400 nm, (FIG. 8(*e*)) D=500 nm PMMA bead. FIG. 8(*f*) illustrates simulated interferometric and MIP images at Z=0 µm, Z=0.4 µm, and Z=0.5 µm. FoV: 3 µm by 3 µm. Scale bars: 1 µm. FIG. 8(*g*) illustrates experimental defocus curves of interferometric and MIP contrasts for D=500 nm PMMA beads. FIG. 8(*h*) illustrates experimental interferometric and MIP images at Z=0 µm, Z=0.4 µm, and Z=0.5 µm. FoV: 3 µm by 3 µm. Red dot lines indicate the maximum MIP contrasts. Blue dot lines indicate the maximum interferometric contrasts. Grey dot lines indicate Z=0 µm. Power before the objective: pump: 48 mW at 1728 cm$^{-1}$, probe: ~1 mW. Acquisition time: 2.36 s per image. Objective piezo scanner, Piezosystemjena, MIPOS 100, Z-axis scanning step: 100 nm. FoV: field of view. D: Diameter. Interfer.: Interferometric. ΔT was set to 1 K for a simplified simulation.

FIGS. 9(*a*) through 9(*f*) illustrate detection limit of WIDE-MIP imaging, according to some exemplary embodiments. Specifically, the figures illustrate defocused interferometric scattering image of FIG. 9(*a*) D=200 nm and FIG. 9(*b*) D=100 nm PMMA beads. FIGS. 9(*c*) and 9(*d*) illustrate MIP image of the same area with the pump at 1728 cm$^{-1}$. FIGS. 9(*e*) and 9(*f*) illustrate off-resonance image showed no contrast. Scale bars: 2 µm. Power before the objective: pump: 31.4 mW at 1728 cm$^{-1}$, 32.2 mW at 1800 cm$^{-1}$, probe: ~1 mW. Image acquisition time: 2.36 s per image. The MIP intensities are normalized by the IR power. The larger signals in panel (d) are from particle aggregates.

FIGS. 10(*a*) through 10(*d*) illustrate spatial resolution of WIDE-MIP imaging, according to some exemplary embodiments. FIGS. 10(*a*) and 10(*b*) illustrate horizontal cross-sectional profiles of interferometric scattering image across one single bead (shown in FIG. 2(*f*)) at FIG. 10(*a*) Z=0.4 µm and FIG. 10(*b*) Z=0 µm. The Gaussian fitted FWHMs are 278 and 404 nm. FIG. 10(*c*) illustrates horizontal cross-sectional profiles of MIP image across the same bead (shown in FIG. 2(*g*)) at Z=0 µm. The Gaussian fitted FWHM is 417 nm. FIG. 10(*d*) illustrates axial cross-sectional profiles of MIP image across the same bead (shown in FIG. 2(*g*)) at Z=0 µm. The depth of focus for MIP imaging is 503 nm, calculated from the Gaussian fitted FWHM.

FIGS. 11(*a*) through 11(*c*) illustrate AFM analysis of size and shape of a single VACV, according to some exemplary embodiments. FIG. 11(*a*) illustrates AFM characterization of a single VACV virus in air. FIGS. 11(*b*) and 11(*c*) are zoom-in AFM images of single viruses labeled with dotted circles in FIG. 11(*a*).

Figures 12A, 12B, 12C, 12D, 12E, 12F, 12G, 12H, 12I, 12J, 12K, 12L:
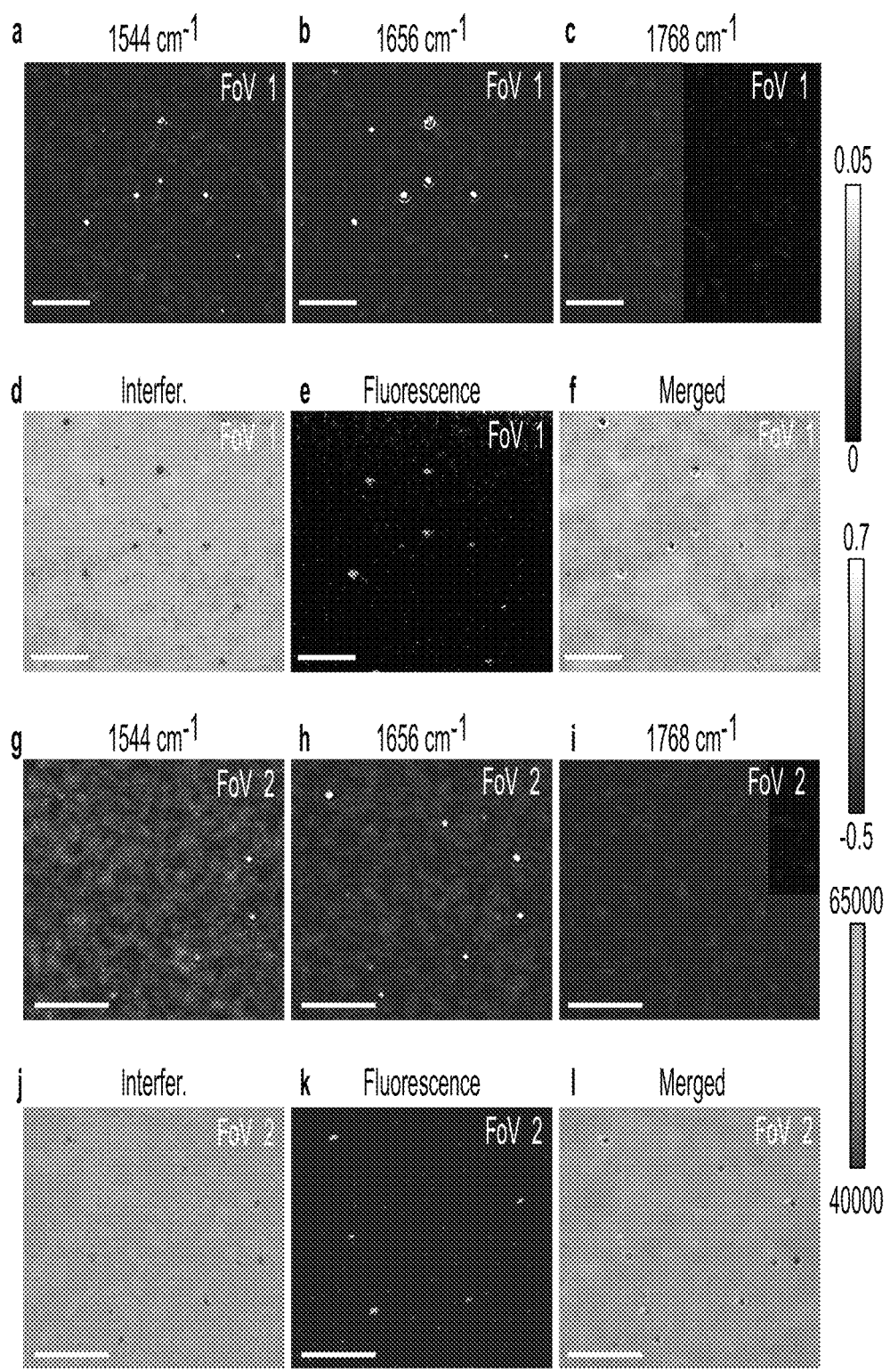
FIGS. 12(a) through 12(l) illustrate fingerprinting detection of single VSVs, according to some exemplary embodiments.

FIGS. 12(*a*) through 12(*l*) illustrate fingerprinting detection of single VSVs, according to some exemplary embodiments. FIG. 12(*a*) illustrates amide II bond-selective image of single VSV viruses with the pump at 1552 cm$^{-1}$ of FoV 1. FIG. 12(*b*) illustrates amide I bond-selective image of the same with the pump at 1656 cm$^{-1}$. FIG. 12(*c*) illustrates off-resonance image showed no contrast. FIG. 12(*d*) illustrates defocused interferometric scattering, FIG. 12(*e*) illustrates fluorescence and FIG. 12(*f*) illustrates merged images of the same area. FIG. 12(*g*) illustrates amide II bond-selective image of single VSV viruses with the pump at 1552 cm$^{-1}$ of FoV 2. FIG. 12(h) illustrates amide I bond-selective image of the same with the pump at 1656 cm$^{-1}$. FIG. 12(i) illustrates off-resonance image showed no contrast. FIG. 12(j) illustrates defocused interferometric scattering, FIG. 12(k) illustrates fluorescence and FIG. 12(l) illustrates merged images of the same area. Scale bars: 10 µm. Power before the objective: pump: 29.1 mW at 1552 cm$^{-1}$, 34.5 mW at 1656 cm$^{-1}$, 35.8 mW at 1768 cm$^{-1}$, probe: ~1 mW. Image acquisition time: 2.36 s per wavenumber. The MIP spectrum is normalized by the IR power. FoV: field of view.

Figures 13A, 13B, 13C:
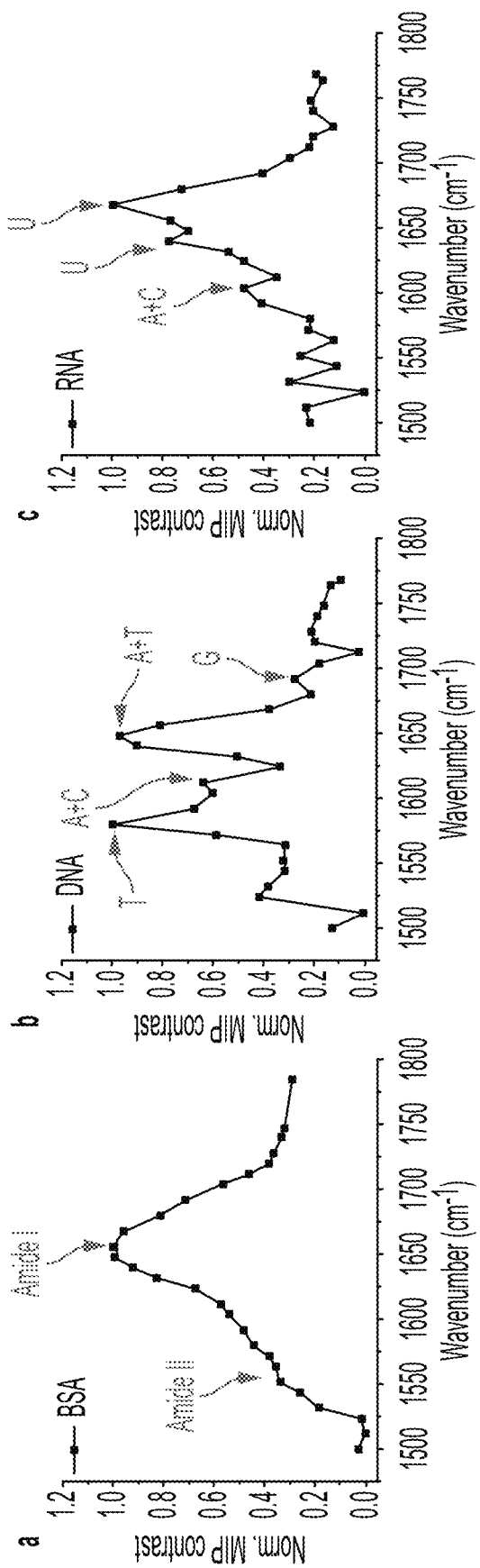
FIGS. 13(a) through 13(c) illustrate WIDE-MIP spectra of pure chemicals, according to some exemplary embodiments.

FIGS. 13(a) through 13(c) illustrate WIDE-MIP spectra of pure chemicals, according to some exemplary embodiments. WIDE-MIP spectra of FIG. 13(a) dried pure protein (BSA) film, FIG. 13(b) dried pure DNA film (cDNA of melanoma cell), and FIG. 12(c) dried pure RNA film (ssRNA of T24 cell). The MIP spectra are normalized by the IR power under each wavenumber.

FIGS. 14(a) through 14(f) illustrate photobleaching analysis of single VACVs, according to some exemplary embodiments. FIGS. 14(a) through 14(c) illustrate continuous fluorescence imaging of VACVs from frame 1 to frame 3. FIG. 14(d) illustrates defocused interferometric scattering image of the same area in FIG. 14(a) through FIG. 14(c). Scale bars: 10 µm. Image acquisition time: 5 s/image. Fluorescence intensity of FIG. 14(e) aggregated viruses (n=15) and (f) single viruses (n=20) in the field of view. Error bars stand for the standard deviations of mean fluorescence intensity.

Figure 15A:
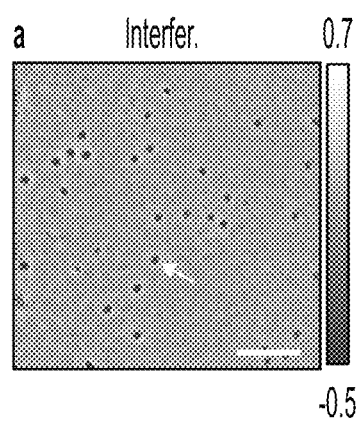
FIGS. 15(a) through 15(c) illustrate high speed chemical imaging of single VACVs, according to some exemplary embodiments.
Figure 15B:
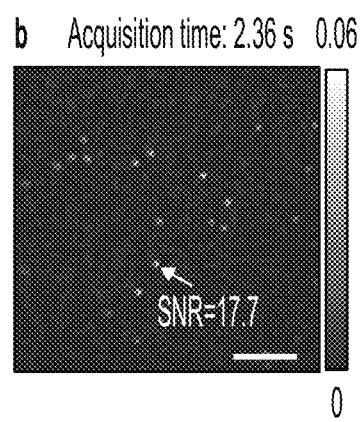
Figure 15C:
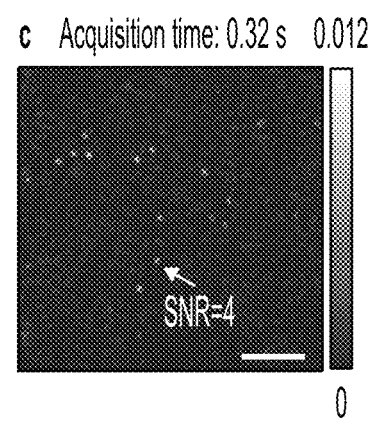

FIGS. 15(a) through 15(c) illustrate high speed chemical imaging of single VACVs, according to some exemplary embodiments. FIG. 15(a) illustrates defocused interferometric scattering image of single VACV viruses. Amide I bond-selective image of the same area with the image acquisition times of FIG. 15(b) 2.36 s and FIG. 15(c) 0.32 s. The pump beam wavenumber is set to 1656 cm$^{-1}$. Power before the objective: 34.5 mW at 1656 cm$^{-1}$, probe: ~1 mW. Scale bars: 5 µm.

TABLE 1

Comparison of detection limit of MIP imaging.

| | Substrate | Sample | SNR | Throughput (beads/min) |
|---|---|---|---|---|
| A[2] | Glass | 100 nm PS | ~70 | 1 |
| B[16] | CaF$_2$ | 100 nm PS | ~10-50 | 1.5 |
| C[15] | CaF$_2$ | 100 nm PMMA | ~13 | 3 |
| This work | Silicon | 100 nm PMMA | ~21 | >3000 |

PS: polystyrene. PMMA: polymethyl methacrylate. SNR: signal-to-noise ratio.

Additional Disclosure Material

The following description and the drawings to which it refers form a part of the present detailed description.

Additional Note 1. Simulation of the Temperature Rise.

A theoretical model was built to solve the temperature difference between hot and cold states. This model was developed using COMSOL. The time-dependent thermal diffusion process can be simulated via the heat-transfer-in-solids module in COMSOL Multiphysics. To calculate the heat dissipation, a heat source term Q(t) is defined as below:

$$C_p \rho \frac{\partial T}{\partial t} + \nabla \cdot (-k \nabla T) = Q(t) \quad (A1)$$

where T is the temperature, t is the time, $C_p$ is the heat capacity, $\rho$ is the density, and k is the thermal conductivity of the material in the system.

In this simulation, a 200 nm PMMA bead was sitting on the silicon substrate in air. The IR heating beam size is 24.6 µm by 30 µm and the power is 40 mW measured from the experiments. Both the initial temperature and the simulation boundary were assumed to be 298 K. The heat source was defined as the domain of the PMMA bead. Heat convection was not considered in this simulation. By solving the equation (A1), the temperature rise distribution of the bead under single IR pulse heating was simulated via COMSOL 6.0. FIG. 7(a) shows the temperature profile of the system. The calculated ΔT on the single bead is ~80 K, integrated from the pulse width of single probe pulse, which is ~129 ns (FIG. 7(b)).

Additional Note 2. Interferometric Defocus-Enhanced MIP Signal for PMMA Beads with Different Sizes.

For PMMA beads with different sizes, the defocus curves of interferometric and MIP contrasts have different shapes. The resulting ΔZ between the maximum interferometric and MIP contrasts varies with the particle size. Similar mechanism of interferometric defocus-enhanced MIP signal was also validated for D=100 nm and D=150 nm PMMA (FIGS. 8(a) and 8(b)), where the simulated focal plane difference ΔZ is found to be 200 nm and 300 nm, respectively. While for big nanoparticles with diameter of 350 nm, 400 nm and 500 nm, the increased particle size results in a noticeable change of the defocus curve in interferometric imaging (FIGS. 8(c) to 8(e)), and the resulted ΔZ was estimated to be <100 nm. The simulated interferometric and MIP images for D=500 nm PMMA show similar maximum at Z=400 and 500 nm, and decreased contrasts at Z=0 nm (FIG. 8(f)). The experimental defocus curve and images for D=500 nm PMMA also match the simulation results very well (FIGS. 8(g) to 8(h)). It indicates that defocusing does not help MIP enhancement for big particles with diameter larger than 300 nm. Since most viruses vary in diameter from 20 nm to 300 nm, defocusing especially works well for small nanoparticles with similar size of single virus, which provides WIDE-MIP as a promising tool for single virus analysis.

Additional Note 3. Detection Limit of WIDE-MIP Imaging.

To demonstrate high-speed widefield photothermal detection of small nanoparticles, we performed WIDE-MIP imaging of both D=200 nm and D=100 nm PMMA beads. The defocused interferometric images of beads in air are shown in FIG. 4(a) (D=200 nm PMMA) and FIG. 9(b) (D=100 nm PMMA). WIDE-MIP images of both types of PMMA beads showed high contrast at 1728 cm$^{-1}$, indicating C=O vibration in PMMA (FIGS. 9(c) and 9(d)), while no contrasts were observed at the off-resonance 1800 cm$^{-1}$ (FIGS. 9(e) and 9(f)). The WIDE-MIP images were acquired with the signal averaged for 2.36 s, showing good SNR of ~87 for 200 nm PMMA and SNR of ~14 for 100 nm PMMA.

Additional Note 4. Spatial resolution of WIDE-MIP imaging.

To evaluate the spatial resolution of WIDE-MIP, we first measured the interferometric contrast profile across one single 200 nm PMMA bead at different focal planes. The Gaussian fitted full width at half maximum (FWHM) along the horizontal axes is 278 nm at the interferometric focus Z=0.4 µm (FIG. 10(a)), which is consistent with the theoretical resolution of the interferometric imaging system. In WIDE-MIP, the interferometric image is defocused at Z=0 µm, the FWHM along the particles is 404 nm, which is a little larger than the resolution of the interferometric system (FIG. 10(b)). Thus, the spatial resolution is 417 nm, measured as FWHM of particles in the WIDE-MIP image captured at the defocus plane of Z=0 μm (FIG. 10(c)). In addition, WIDE-MIP system allows depth resolved measurement, the depth of focus for the imaging system is 503 nm, measured as FWHM of the MIP contrast profile in WIDE-MIP image from Z=−1 μm to Z=1 μm (FIG. 10(d)).
Additional Note 5. Atomic Force Microscope Analysis of Single Viruses.

Figures 11A, 11B, 11C:
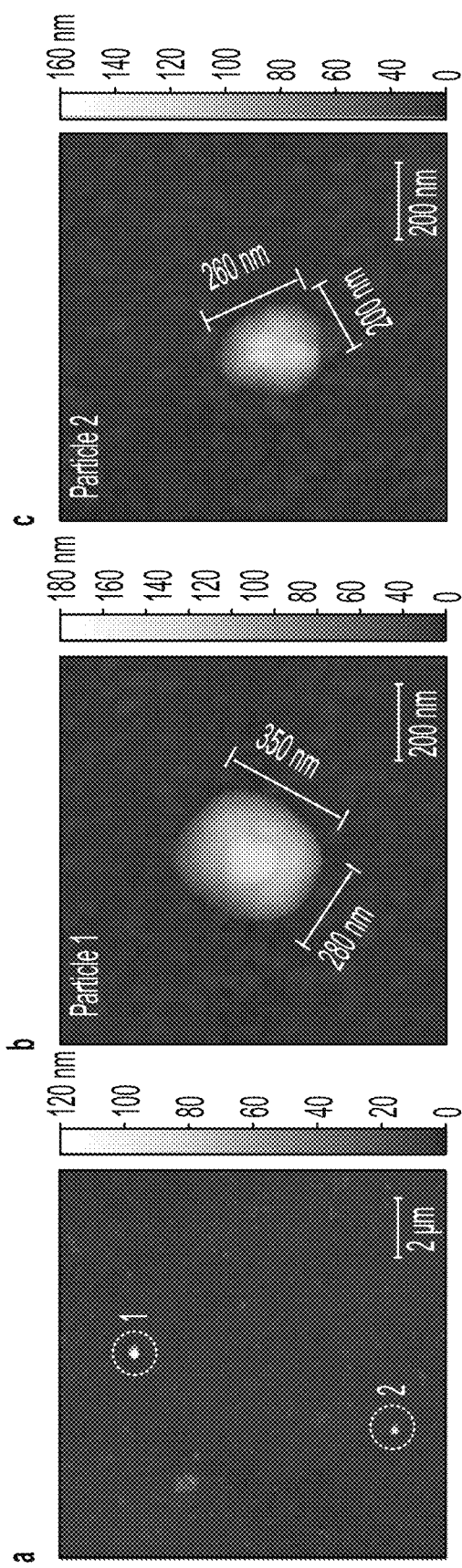
FIGS. 11(a) through 11(c) illustrate AFM analysis of size and shape of a single VACV, according to some exemplary embodiments.

Size and morphology characterizations of single vaccinia viruses (VACV) were performed on an atomic force microscope (AFM) (Nano Wizard 4 XP, Bruker Nano) in tapping mode (FIG. 11(a)). AFM analysis further confirmed the single VACV particle 1 on the silicon substrate with a brick-shaped size of 280×350 nm (FIG. 11(b)) that is consistent with the reported viral shape and dimensions VACV particle 2 looks like a denatured rather than intact virion (FIG. 11(c)). It is highly likely happened during the fixation process.

Additional Note 6. Peak Assignments of Viral WIDE-MIP Spectra.

The assignments of the chemical components were validated by the pure protein, DNA and RNA film samples (FIGS. 13(a), 13(b), 13(c)). The dominant two peaks in the spectrum of pure BSA are contributed by the amide I band at 1650 cm$^{-1}$ and the amide II band at 1550 cm$^{-1}$, indicating the vibrations in the protein. For the assignments of base residues in the nucleic acids, according to the literature, the peaks at 1656 cm$^{-1}$ and 1604 cm$^{-1}$ are assigned to the NH$_2$ bending and C=N stretching vibrations in adenine (A) residue. The peaks at 1680 cm$^{-1}$ and 1640 cm$^{-1}$ are assigned to the NH in-plane deformation vibration and C=O and C=C stretching vibrations in uracil (U) residue, respectively. The peaks at 1656 cm$^{-1}$ and 1580 cm$^{-1}$ are assigned to the $C_4$=O stretching vibration and ring stretching vibration in thymine (T) residue, respectively. The peak at 1604 cm$^{-1}$ is assigned to the In-plane ring vibrations in cytosine (C) residue. The peak at 1692 cm$^{-1}$ is assigned to the C=O stretching vibration and NH$_2$ scissoring vibration in guanine (G) residue. Although the peak assignments of base residues in literature show ~10 cm$^{-1}$ higher than our results, we attribute this small difference to the different sample state, testing environment and instruments. The peak at ~1725 cm$^{-1}$ is assigned to the C=O stretching vibration in viral lipids.

To further demonstrate the accuracy of MIP spectra for virus fingerprinting, we provided the biochemical components and the FTIR spectrum of pure VZV powder for comparison (FIG. 5(l)). For a VZV, it has a lipid-rich envelope derived from cellular membranes, within which viral glycoproteins are inserted. Within the VZV, there are ~125-kb linear double-stranded DNA genome and ~3000 proteins. Notably, three envelope proteins, namely glycoprotein B, glycoprotein H, and glycoprotein L, have been identified as essential VZV proteins forming the core fusion complex. These proteins have known 3D structure, and a significant proportion of their secondary structures consist of β-sheets, with turn structures also present. The results in FIGS. 5(a) to 5(l) showed that WIDE-MIP can accurately identify VZV viruses and reveal T residue vibrations in viral DNA, lipids and enriched β sheet components in VZV viral proteins, which are consistent with the biochemical components in VZV and FTIR spectrum of VZV powder.

Additional Note 7. Comparison Between Fluorescence-Detected Mid-Infrared Photothermal Microscopy (F-MIP) and WIDE-MIP.

While F-MIP imaging offers a larger modulation depth, WIDE-MIP of the current disclosure offers a distinct advantage in detecting bionanoparticles that have very low levels of expressed fluorescence tags.

One of the key requirements for F-MIP is a robust and high-quality fluorescence signal. In this regard, it is essential to highlight the difference in fluorescence probe labeling quantity between prior work and the current work. In prior work, high concentrations of commercial chemical dyes (10 μM Nile Red or Rhodamine) were used for labeling high-content biological components, such as proteins in cells. While in this current work, both VACV and VSV viruses were expressed with an enhanced green fluorescent protein (eGFP) envelope. The expressed eGFP was fused to the VSV G protein, where each VSV contains ~1,200 molecules of the G protein on the viral surface. With the formed G protein and G-cGFP fusion protein heterodimers, there are ~600 eGFP molecules on the surface of a single virus. Comparing the size of cGFP (2.4×4.2 nm) to that of the VSV virus (80×180 nm), we estimate that only 1.3% of a single VSV virus consists of eGFP. Thus, due to the lower content of total fluorescence probes in this study, the resulting fluorescence intensity is significantly weaker compared to the prior work. Consequently, the reduced fluorescence intensity poses a challenge when attempting to implement fluorescence-based MIP imaging of single viruses in this work.

To demonstrate this, we used the same camera (FLIR, Grasshopper3GS3-U3-51S5M) as that used in the prior work to perform the fluorescence imaging of VACVs expressing eGFP, and tried the same paraments with a camera exposure time of 50 ms and a gain of 20 dB. However, these settings failed to capture the fluorescence of single viruses. We increased the exposure time to 500 ms for imaging aggregated viruses, while using the exposure time of ~5 s and maximum gain setting for single viruses (FIGS. 14(a) to 14(d)). Although the photobleaching of aggregated virus showed a similar level as the prior work (<~10%, FIG. 14(e)), severe photobleaching was observed in single viruses (>~95%, FIG. 14(f)). This photobleaching of single viruses limits the detection of photothermal modulation and acquisition speed. Considering that the MIP signal relies on the difference in fluorescence intensity between the IR-on (hot) and IR-off (cold) states, this severe bleaching at the single-virus level further compromises the reliability of F-MIP.

On the other hand, scattering-based imaging offers certain advantages, particularly in terms of the photon budget. When compared to fluorescence imaging, scattering-based techniques allow for shorter camera exposure times, higher full well capacity, and reduced saturation issues. In the prior work, a CMOS camera (FLIR, Grasshopper3GS3-U3-51S5M) with a full well depth of ~10,000 and a frame rate of 20 Hz was used for wide-field FMIP imaging. In this work, we employed a camera with a frame rate of 1270 Hz and a full well capacity of 2 million wells (Q-2HFW, Adimec). This choice ensured that sufficient probe photons were received at each pixel, enhancing the quality of the scattering signal. Additionally, the interferometric geometry further enhanced the weak scattering signal of single viruses.

Taking into account these limitations and technical considerations, F-MIP imaging is not suitable for the detection of single viruses. Instead, we focused on fluorescence-guided MIP analysis of single viruses. In this current work, we first collected and analyzed the fingerprint spectra of cGFP-virus samples (VACV and VSV) and performed co-localization of fluorescence imaging and MIP imaging to demonstrate the accurate identification of viruses using the WIDE-MIP technique (FIGS. 4(a) to 4(r)). However, for the analysis of actual virus samples, label-free methods may be more suitable for diagnostic purposes. Thus, we further performed MIP imaging and fingerprint spectra of unlabeled pure VZV viruses to achieve label-free detection of single viruses (FIGS. 5(a) to 5(l)).

Additional Note 8. Potential Application for Rapid Quality Control of Viral Vectors.

We further demonstrated high-speed chemical imaging of single VACV by reducing the acquisition time to 0.32 s per image per wavenumber of single viruses and the SNR of one single VACV is ~4 within the field of view (FoV) of 24 by 24 μm (FIGS. 15(a) to 15(c)). In comparison, the image acquisition time of one single virus is 46.4 s at the FoV of ~2.3 by 2.3 μm in previous work. Together, WIDE-MIP microscopy provides ~1000-fold higher throughput, enabling fingerprinting of viral vectors for quality control.

To use this method, the viral vector products can be prepared on a silicon substrate following the sample preparation protocol and then imaged using WIDE-MIP. The substrate will then be taken for WIDE-MIP imaging and get the fingerprints of the particles from the products. For fingerprint region from 1500 cm$^{-1}$ to 1750 cm$^{-1}$, fingerprinting at each FoV will take at least 8.32 s with the scanning step at 10 cm$^{-1}$. Quality control results can be obtained by comparing the fingerprints of the products with those from the standard viral vector, followed by spectral analysis of viral proteins and viral nuclei acids to determine stability, purity, and integrity. Additionally, WIDE-MIP can advance the development of new viral vectors by facilitating their characterization and optimization.

The invention claimed is:

1. A wide-field microscopy method for imaging a sample, comprising:
   generating infrared light to be directed onto the sample to selectively heat the sample;
   generating probe light to be directed onto the sample;
   collecting with an objective probe light after interacting with sample;
   detecting the collected probe light at a detector; and
   adjusting a relative distance between the objective and sample to defocus interferometric contrast of the collected probe light and correspondingly increase photothermal contrast indicative of infrared absorption by the sample.

2. The method of claim 1, wherein the probe light is pulsed.

3. The method of claim 2, wherein the infrared light is pulsed.

4. The method of claim 3, further comprising synchronizing time of infrared and probe light pulses and the detection system.

5. The method of claim 1, wherein the infrared light is mid-infrared (MIR) light.

6. The method of claim 1, wherein the source of infrared light is a mid-infrared (MIR) laser.

7. The method of claim 1, wherein the source of the probe light is a visible light laser.

8. The method of claim 1, wherein the detection system comprises a camera.

9. The method of claim 8, wherein the camera is a CMOS camera.

10. The method of claim 1, wherein the sample comprises a virus.

11. The method of claim 1, wherein the optical defocus enhancement enables infrared spectroscopic analysis of individual viruses.

12. The method of claim 1, in which the widefield infrared microscopy method is used to perform viral fingerprint analysis.

13. The method of claim 1, comprising measuring a change of detected probe light indicative of infrared absorption at a plurality of relative distances between the sample and objective to determine an optimal defocus that substantially maximizes the detection of infrared absorption by the sample.

* * * * *